(12) United States Patent
Saori

(10) Patent No.: US 7,961,402 B2
(45) Date of Patent: Jun. 14, 2011

(54) HIGH ZOOM-RATIO ZOOM LENS SYSTEM

(75) Inventor: Masakazu Saori, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/697,370

(22) Filed: Feb. 1, 2010

(65) Prior Publication Data

US 2010/0195215 A1    Aug. 5, 2010

(30) Foreign Application Priority Data

Feb. 2, 2009 (JP) ................................. 2009-021158
Jan. 28, 2010 (JP) ................................. 2010-016252

(51) Int. Cl.
*G02B 15/14* (2006.01)

(52) U.S. Cl. ...................................................... 359/683

(58) Field of Classification Search .................. 359/681, 359/683, 676, 756, 757
See application file for complete search history.

(56) References Cited

U.S. PATENT DOCUMENTS

| 5,189,557 A | 2/1993 | Endo |
| 2004/0051959 A1 | 3/2004 | Eguchi |
| 2006/0082897 A1 | 4/2006 | Enomoto |
| 2007/0047097 A1 | 3/2007 | Nakamura et al. |
| 2007/0263295 A1 | 11/2007 | Enomoto |
| 2008/0297914 A1 | 12/2008 | Enomoto |
| 2009/0122418 A1* | 5/2009 | Atsuumi et al. ............... 359/683 |
| 2010/0033838 A1 | 2/2010 | Saori |

FOREIGN PATENT DOCUMENTS

| JP | 4-146407 | 5/1992 |
| JP | 4-186211 | 7/1992 |
| JP | 4-186213 | 7/1992 |
| JP | 11-174327 | 7/1999 |

* cited by examiner

*Primary Examiner* — Alicia M Harrington
(74) *Attorney, Agent, or Firm* — Greenblum & Bernstein P.L.C.

(57) ABSTRACT

A high zoom-ratio zoom lens system includes a positive first lens group, a negative second lens group, a positive third lens group, a negative fourth lens group, a positive fifth lens group, and a negative sixth lens group, in this order from an object. Upon zooming from the short focal length extremity to the long focal length extremity, a distance between the positive first lens group and the negative second lens group increases, and a distance between the negative second lens group and the positive third lens group decreases.
The high zoom-ratio zoom lens system satisfies the following conditions:

$$5.0 < f1/|f2| < 9.0 \, (f2<0) \tag{1}$$

$$4.1 < f1/f5 < 6.0 \tag{2}$$

wherein
f1 designate the focal length of the positive first lens group;
f2 designate the focal length of the negative second lens group; and
f5 designate the focal length of the positive fifth lens group.

6 Claims, 25 Drawing Sheets

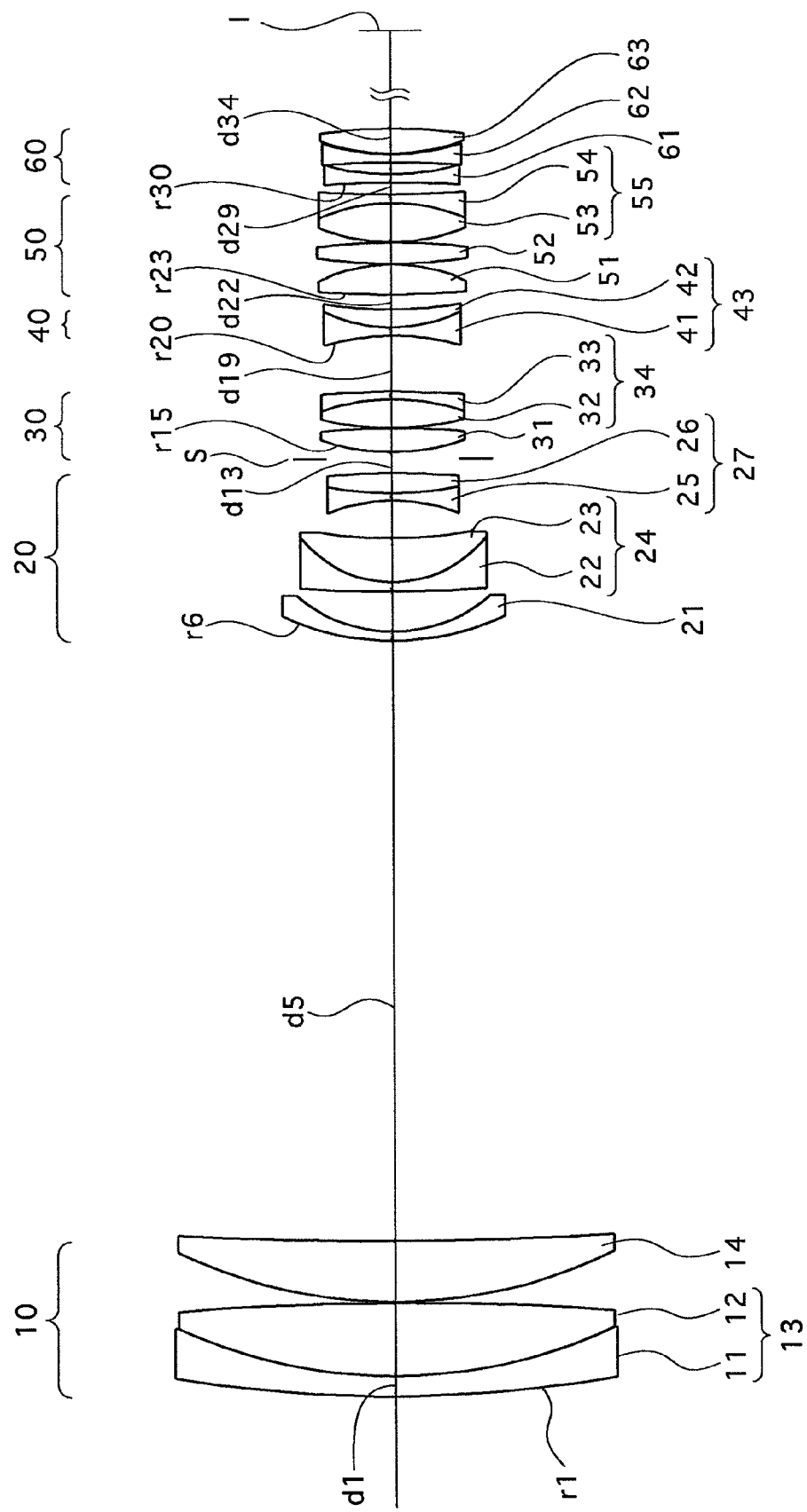

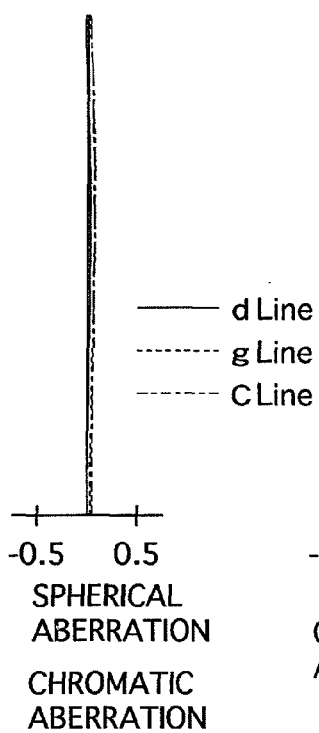
Fig. 2A
FNo.=1:5.8
—— d Line
------ g Line
------ C Line
-0.5    0.5
SPHERICAL
ABERRATION
CHROMATIC
ABERRATION
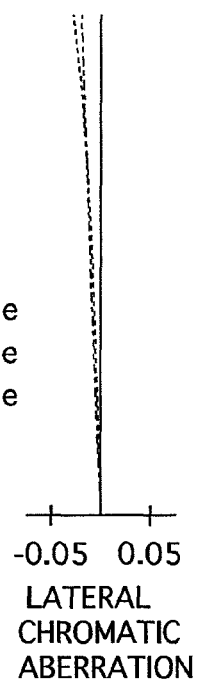
Fig. 2B
Y=14.24
-0.05   0.05
LATERAL
CHROMATIC
ABERRATION
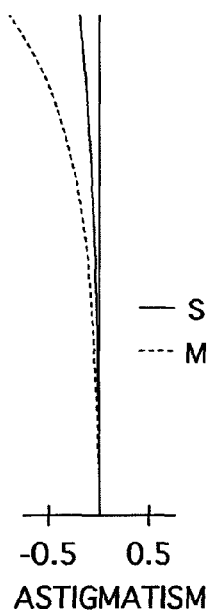
Fig. 2C
Y=14.24
—— S
---- M
-0.5    0.5
ASTIGMATISM
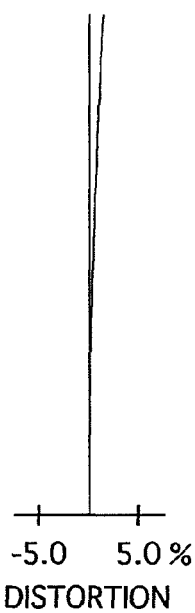
Fig. 2D
Y=14.24
-5.0    5.0 %
DISTORTION
Fig. 3A   Y=0.00   +0.20 / -0.20
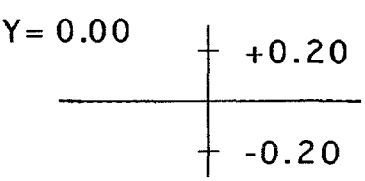
Fig. 3B   Y=6.00   +0.20 / -0.20
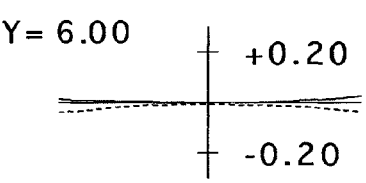
Fig. 3C   Y=10.00   +0.20 / -0.20
—— d Line
------ g Line
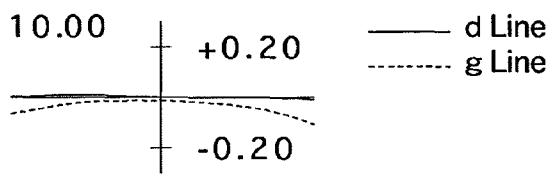

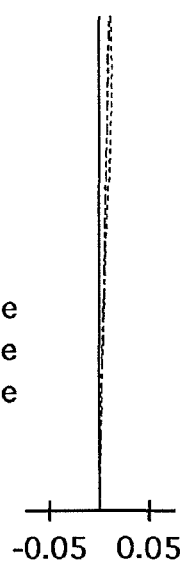
Fig. 5A
FNo.=1:3.5
—— d Line
----- g Line
------ C Line
-0.5  0.5
SPHERICAL
ABERRATION
CHROMATIC
ABERRATION
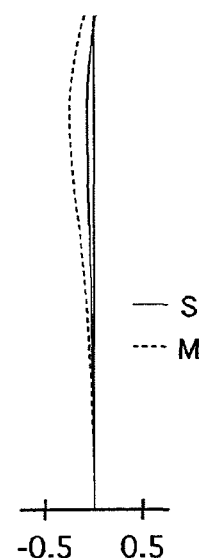
Fig. 5B
Y=14.24
-0.05  0.05
LATERAL
CHROMATIC
ABERRATION
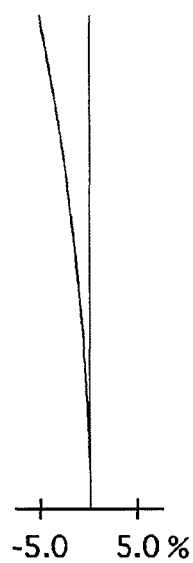
Fig. 5C
Y=14.24
—— S
---- M
-0.5  0.5
ASTIGMATISM
Fig. 5D
Y=14.24
-5.0  5.0 %
DISTORTION
Fig. 6A  Y=0.00   +0.20 / -0.20
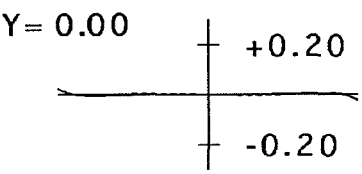
Fig. 6B  Y=6.00   +0.20 / -0.20
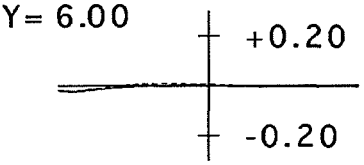
Fig. 6C  Y=10.00  +0.20 / -0.20
—— d Line
----- g Line
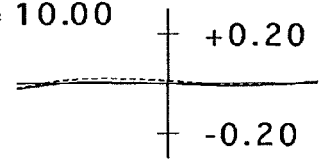

Fig. 8A  Fig. 8B  Fig. 8C  Fig. 8D
FNo.=1:5.8  Y=14.24  Y=14.24  Y=14.24
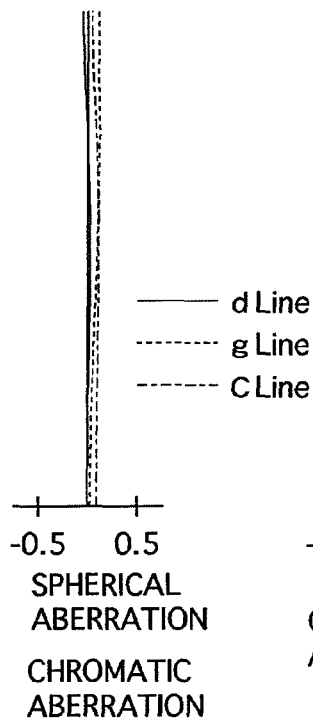
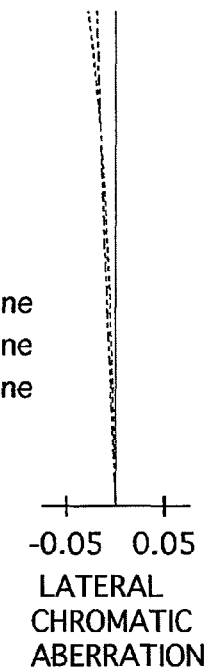
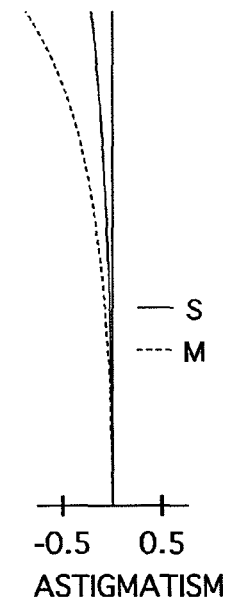
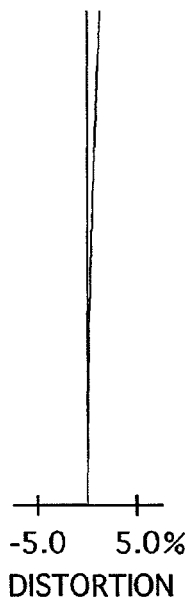
-0.5  0.5  -0.05  0.05  -0.5  0.5  -5.0  5.0%
SPHERICAL  LATERAL  ASTIGMATISM  DISTORTION
ABERRATION  CHROMATIC
CHROMATIC  ABERRATION
ABERRATION
Fig. 9A  Y=0.00
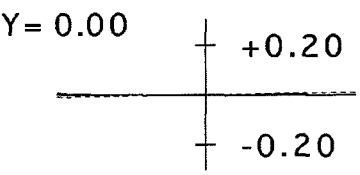
Fig. 9B  Y=6.00
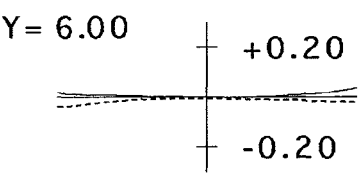
Fig. 9C  Y=10.00
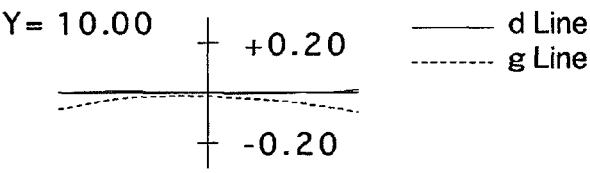

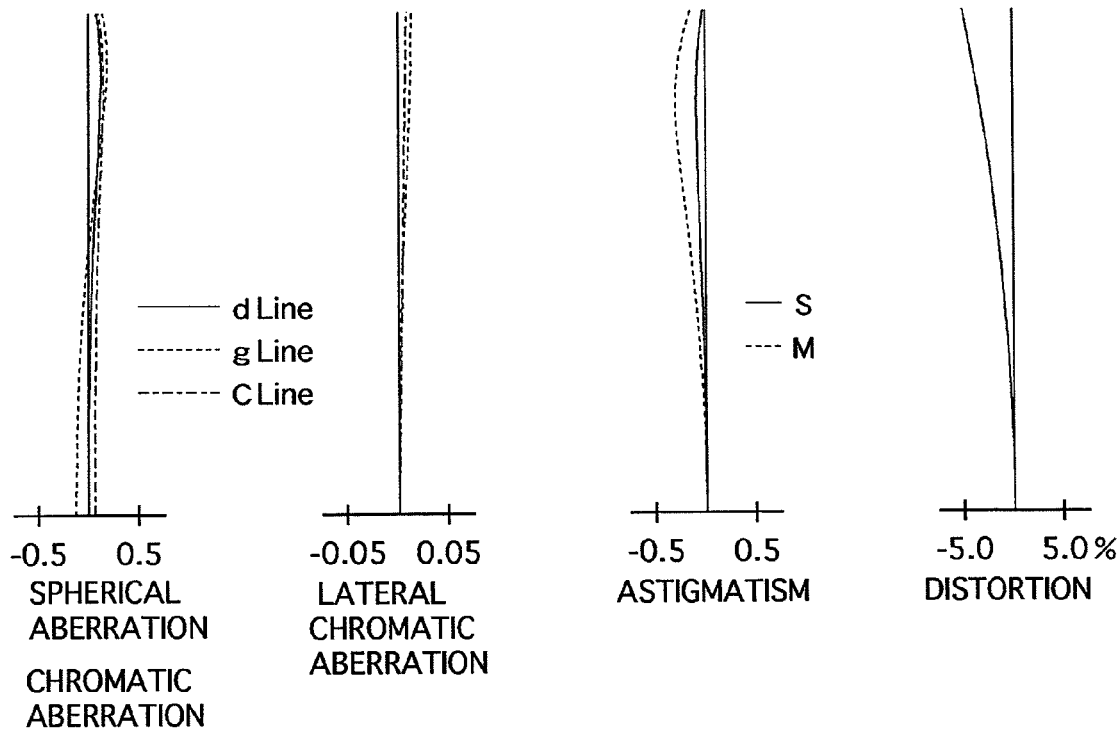

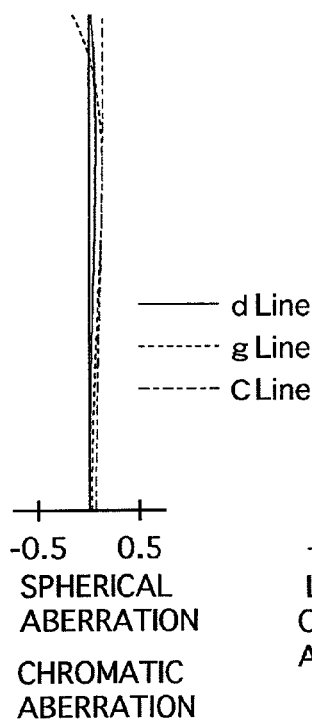
Fig. 14A
FNo.=1:5.8
—— d Line
------ g Line
------ C Line
-0.5   0.5
SPHERICAL
ABERRATION
CHROMATIC
ABERRATION
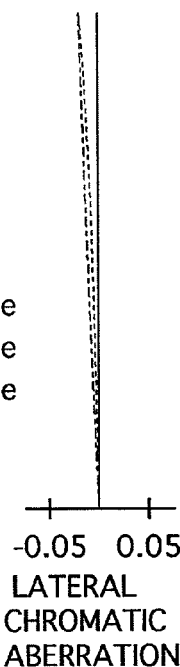
Fig. 14B
Y=14.24
-0.05  0.05
LATERAL
CHROMATIC
ABERRATION
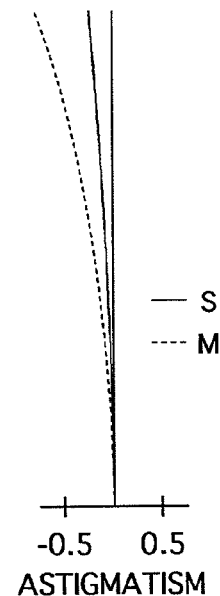
Fig.14C
Y=14.24
— S
--- M
-0.5   0.5
ASTIGMATISM
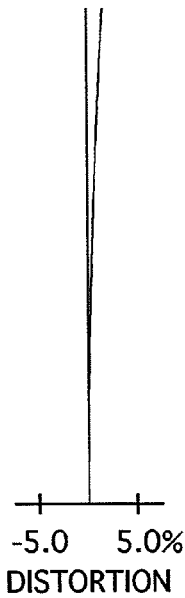
Fig. 14D
Y=14.24
-5.0   5.0%
DISTORTION
Fig. 15A   Y=0.00  +0.20 / -0.20
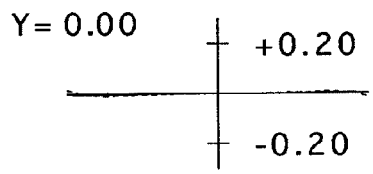
Fig. 15B   Y=6.00  +0.20 / -0.20
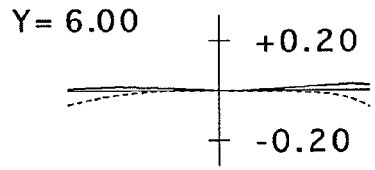
Fig. 15C   Y=10.00  +0.20 / -0.20
—— d Line
------ g Line
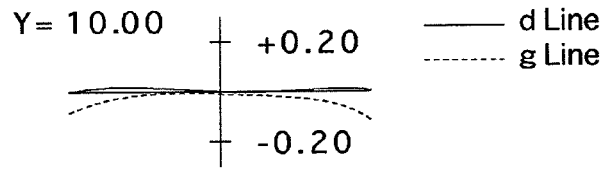

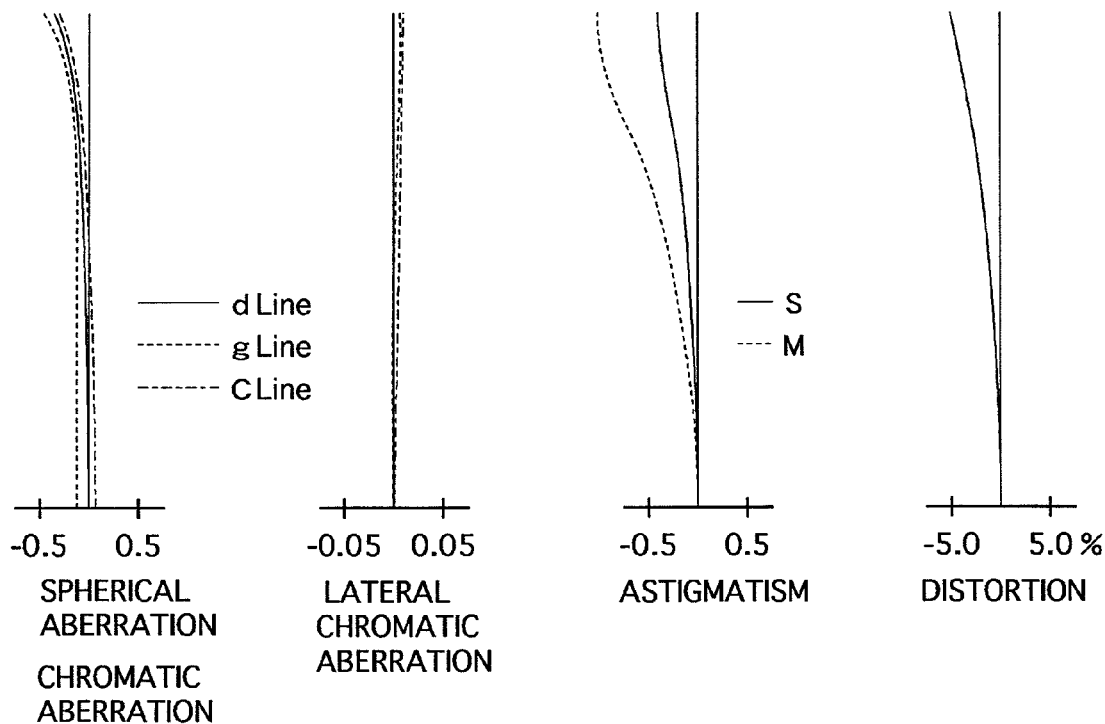
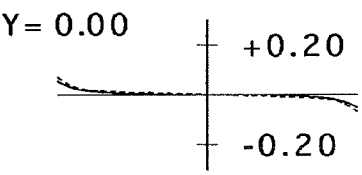
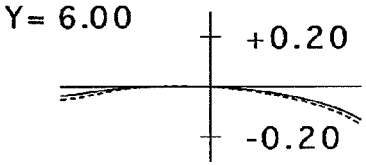
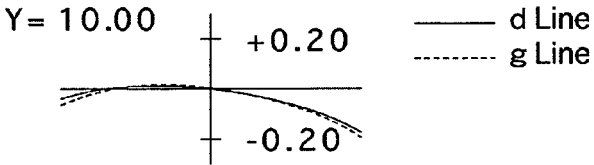

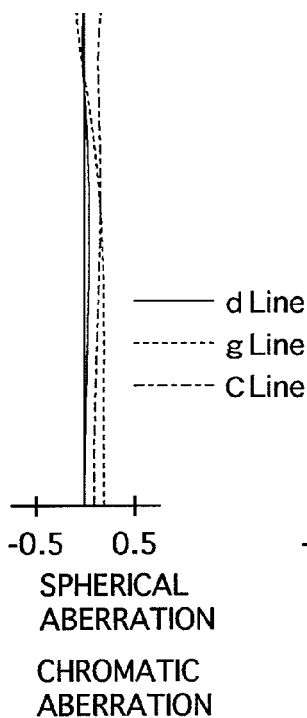
Fig. 20A
FNo.=1:5.8
— d Line
----- g Line
--- C Line
-0.5  0.5
SPHERICAL
ABERRATION
CHROMATIC
ABERRATION
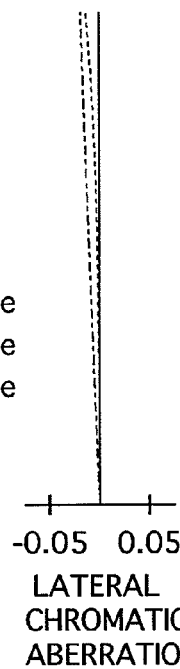
Fig. 20B
Y=14.24
-0.05  0.05
LATERAL
CHROMATIC
ABERRATION
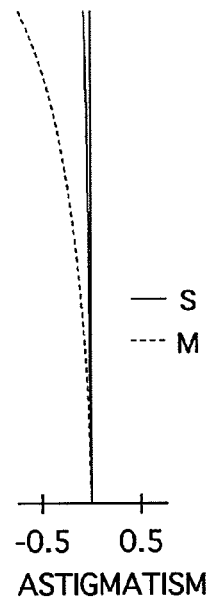
Fig. 20C
Y=14.24
— S
--- M
-0.5  0.5
ASTIGMATISM
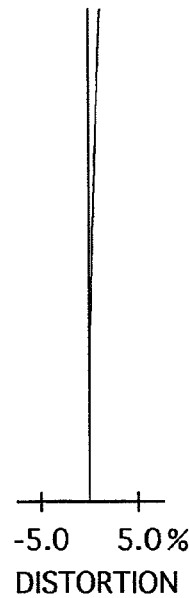
Fig. 20D
Y=14.24
-5.0  5.0%
DISTORTION
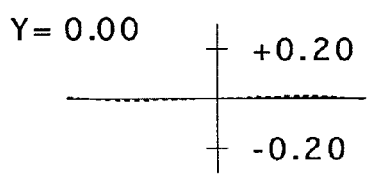
Fig. 21A   Y=0.00
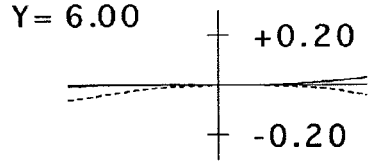
Fig. 21B   Y=6.00
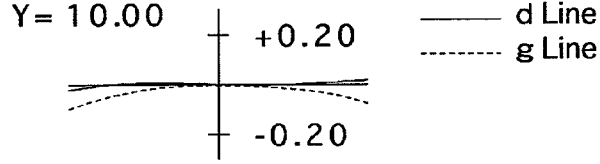
Fig. 21C   Y=10.00
— d Line
----- g Line

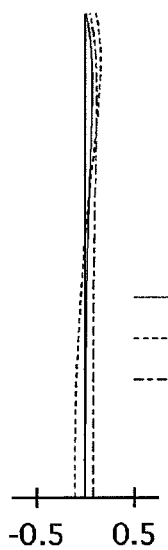
Fig. 23A
FNo.=1:3.5
-0.5  0.5
SPHERICAL
ABERRATION
CHROMATIC
ABERRATION
—— d Line
-- - - - g Line
------ C Line
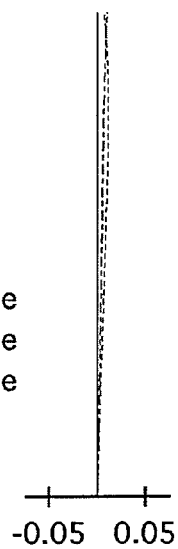
Fig. 23B
Y=14.24
-0.05  0.05
LATERAL
CHROMATIC
ABERRATION
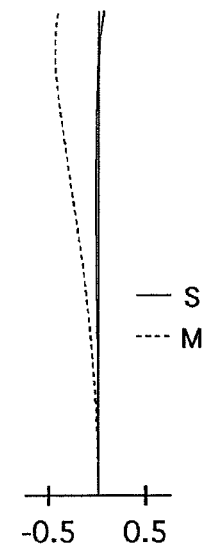
Fig. 23C
Y=14.24
-0.5  0.5
ASTIGMATISM
—— S
---- M
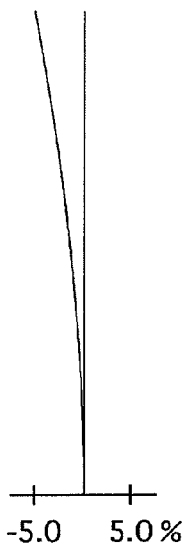
Fig. 23D
Y=14.24
-5.0  5.0 %
DISTORTION
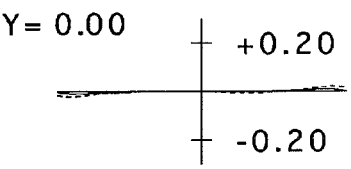
Fig. 24A  Y=0.00  +0.20 / -0.20
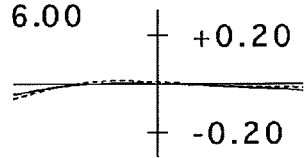
Fig. 24B  Y=6.00  +0.20 / -0.20
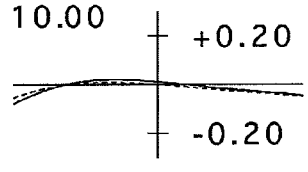
Fig. 24C  Y=10.00  +0.20 / -0.20
—— d Line
------ g Line

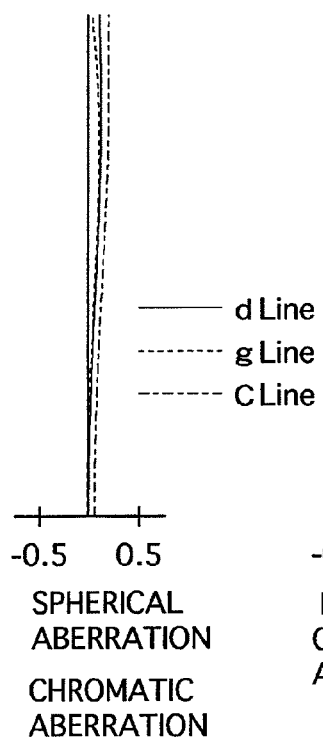
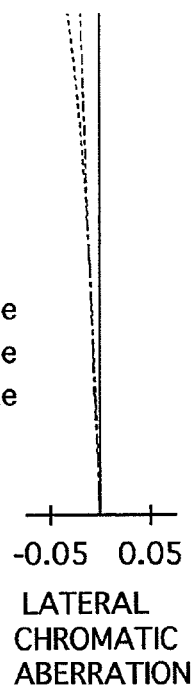
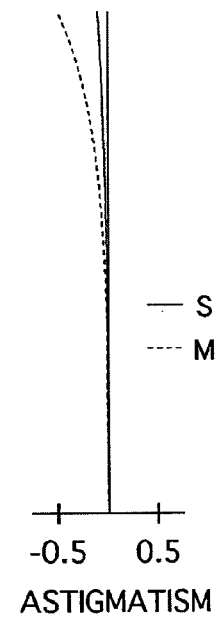
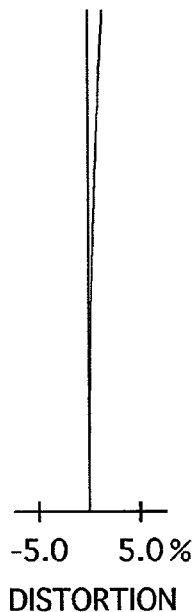
Fig. 26A FNo.=1:5.8 SPHERICAL ABERRATION CHROMATIC ABERRATION
Fig. 26B Y=14.24 LATERAL CHROMATIC ABERRATION
Fig. 26C Y=14.24 ASTIGMATISM
Fig. 26D Y=14.24 DISTORTION
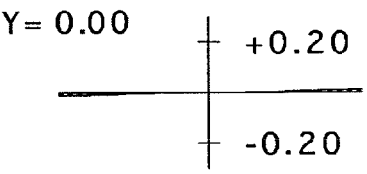
Fig. 27A  Y=0.00
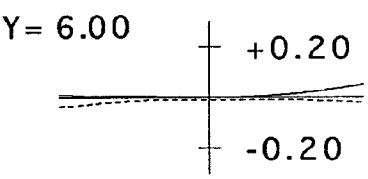
Fig. 27B  Y=6.00
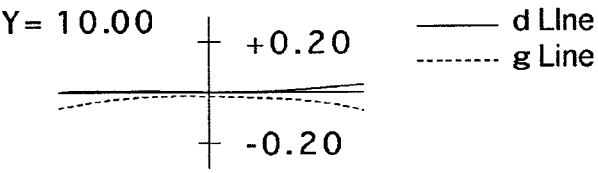
Fig. 27C  Y=10.00

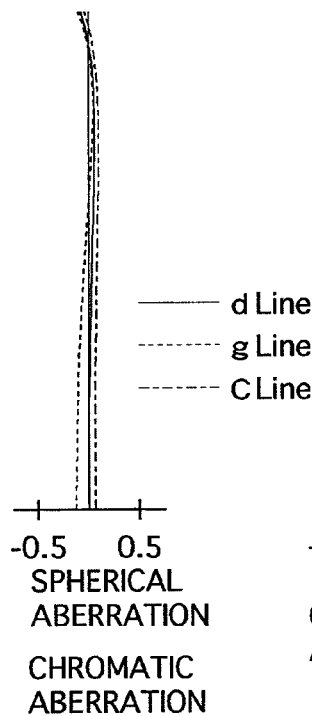
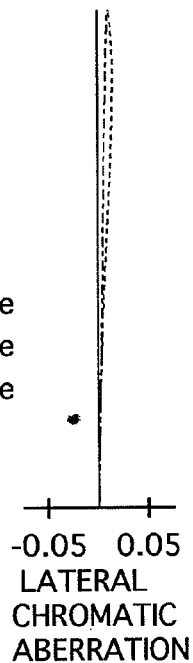
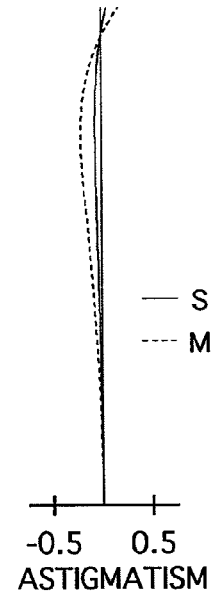
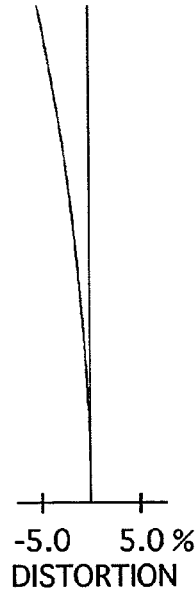
Fig. 29A  FNo.=1:3.5  SPHERICAL ABERRATION CHROMATIC ABERRATION
Fig. 29B  Y=14.24  LATERAL CHROMATIC ABERRATION
Fig. 29C  Y=14.24  ASTIGMATISM
Fig. 29D  Y=14.24  DISTORTION
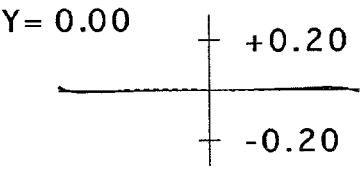
Fig. 30A  Y=0.00
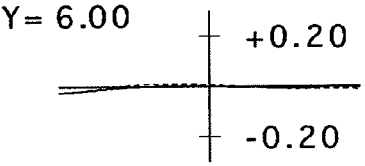
Fig. 30B  Y=6.00
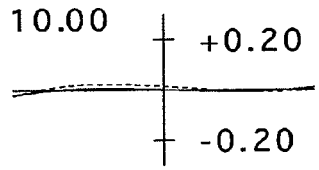
Fig. 30C  Y=10.00

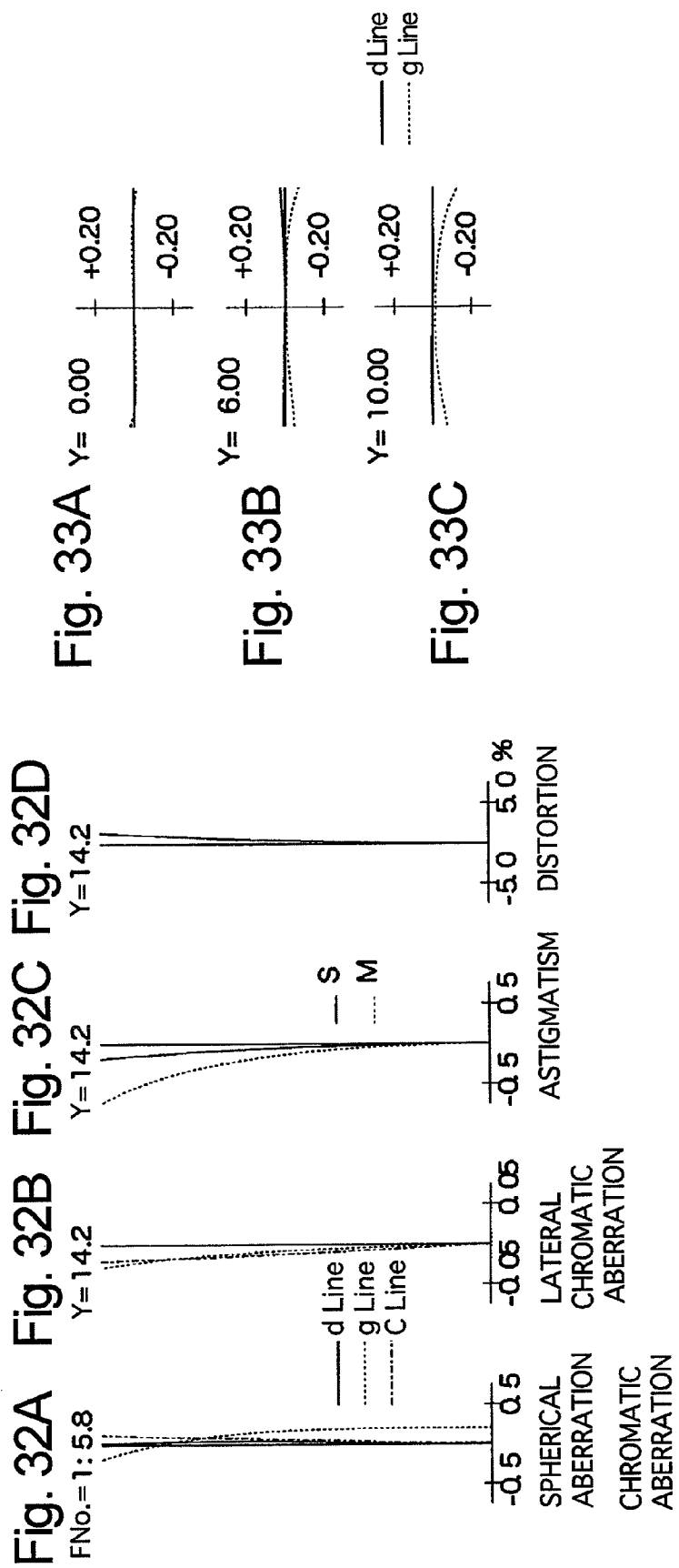

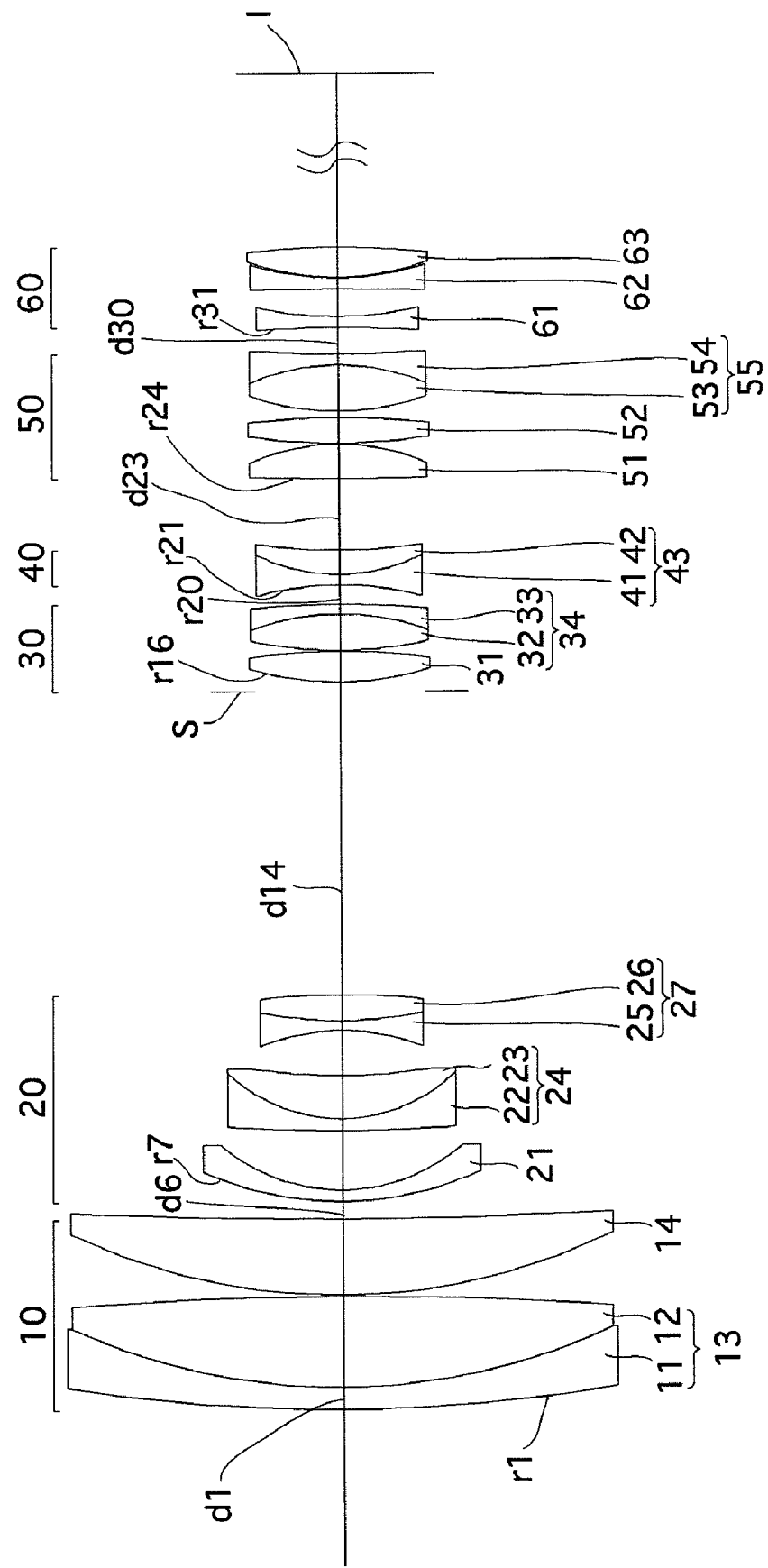

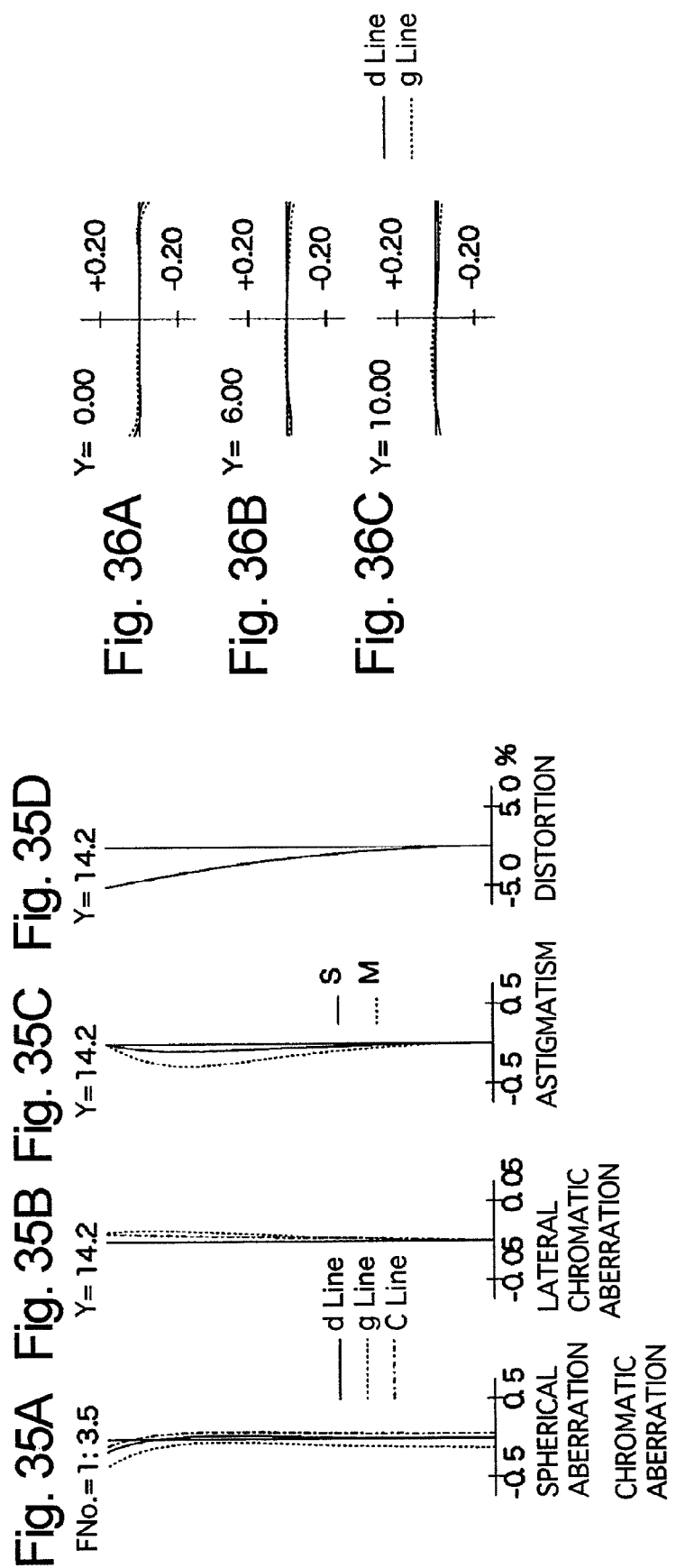

HIGH ZOOM-RATIO ZOOM LENS SYSTEM

BACKGROUND OF THE INVENTION

1. Field of the Invention

The present invention relates to a high zoom-ratio zoom lens system, having a zoom ratio exceeding 13:1 for use in an SLR camera, and especially for use in a digital SLR camera.

2. Description of Related Art

A high zoom-ratio zoom lens system having a zoom ratio of approximately 10:1 and a focal length of 300 mm at the long focal length extremity is known, in the art, to have a six lens group arrangement, i.e., a positive lens group, a negative lens group, a positive lens group, a negative lens group, a positive lens group and a negative lens group, in this order from the object. Such known high zoom-ratio zoom lens systems are disclosed in Japanese Unexamined Patent Publication Nos. H11-174327, H04-186213, H04-186211 and H04-146407.

However, the high zoom-ratio zoom lens system disclosed in Japanese Unexamined Patent Publication No. H11-174327 has a focal length of 300 mm at the long focal length extremity, so that a sufficient high zoom ratio cannot be attained.

On the other hand, in the high zoom-ratio zoom lens systems disclosed in Japanese Unexamined Patent Publication Nos. H04-186213, H04-186211 and H04-146407, the telephoto side weighs in the optical design thereof; and, the high zoom-ratio zoom lens systems achieve a focal length of 350 mm at the long focal length extremity and an F-number of 5.6. However, the focal length at the short focal length extremity is approximately 35 mm; and, if an APS-C sized digital SLR camera is used, the angle-of-view thereof is only approximately 45°.

SUMMARY OF THE INVENTION

In view of the above-mentioned drawbacks, the present invention provides a high zoom-ratio zoom lens system having superior optical quality, and includes six lens groups, i.e., a first lens group having a positive refractive power (hereinafter, a positive first lens group), a second lens group have a negative refractive power (hereinafter, a negative second lens group), a third lens group having a positive refractive power (hereinafter, a positive third lens group), a fourth lens group having a negative refractive power (hereinafter, a negative fourth lens group), a fifth lens group having a positive refractive power (hereinafter, a positive fifth lens group), and a sixth lens group having a negative refractive power (hereinafter, a negative sixth lens group), in this order from the object. This high zoom-ratio zoom lens system of the present invention achieves a zoom ratio exceeding 13:1, a focal length of 350 mm at the long focal length extremity, and an F-number of 5.8, and has an angle-of-view of approximately 60° at the short focal length extremity.

According to an aspect of the present invention, there is provided a high zoom-ratio zoom lens system including a positive first lens group, a negative second lens group, a positive third lens group, a negative fourth lens group, a positive fifth lens group, and a negative sixth lens group, in this order from the object.

Upon zooming from the short focal length extremity to the long focal length extremity, a distance between the positive first lens group and the negative second lens group increases, and a distance between the negative second lens group and the positive third lens group decreases.

The high zoom-ratio zoom lens system satisfies the following conditions:

$$5.0 < |f1/f2| < 9.0 \; (f2<0) \quad (1)$$

$$4.1 < f1/f5 < 6.0 \quad (2)$$

wherein f1 designate the focal length of the positive first lens group;

f2 designate the focal length of the negative second lens group; and f5 designate the focal length of the positive fifth lens group.

The positive fifth lens group preferably includes more than three positive lens elements, and at least three positive lens elements satisfy the following condition:

$$v5p > 60 \quad (3)$$

wherein v5p designates the Abbe number of each of the at least three positive lens elements of the positive fifth lens group.

When zooming is being performed, the negative second lens group preferably remains stationary with respect to the imaging plane of the high zoom-ratio zoom lens system.

The negative sixth lens group preferably includes a negative lens element, a negative lens element and a positive lens element, in this order from the object.

Each of the positive first lens group and the positive fifth lens group preferably includes at least one positive lens element which is made from a glass lens-material of anomalous dispersion characteristics; and, the at least one positive lens element preferably satisfies the following conditions:

$$vd > 80 \quad (4)$$

$$P_{g,F} > 0.535 \quad (5)$$

wherein vd designates the Abbe number of the at least one positive lens element; and $P_{g,F}$ designates the partial dispersion ratio of the at least one positive lens element.

More preferably, the at least one positive lens element satisfies the following condition:

$$P_{g,F} > 0.540 \quad (5')$$

The present disclosure relates to subject matters contained in Japanese Patent Application No. 2009-21158 (filed on Feb. 2, 2009) and Japanese Patent Application No. 2010-16252 (filed on Jan. 28, 2010) which are expressly incorporated herein in their entirety.

BRIEF DESCRIPTION OF THE DRAWINGS

The present invention will be discussed below in detail with reference to the accompanying drawings, in which:

FIG. 1 shows a lens arrangement of a first embodiment of a high zoom-ratio zoom lens system when an object at infinity is in an in-focus state at the long focal length extremity;

FIGS. 2A, 2B, 2C and 2D show aberrations of the lens arrangement shown in FIG. 1;

FIGS. 3A, 3B and 3C show lateral aberrations of the lens arrangement shown in FIG. 1;

FIGS. 5A, 5B, 5C and 5D show aberrations of the lens arrangement shown in FIG. 4;

FIGS. 6A, 6B and 6C show lateral aberrations of the lens arrangement shown in FIG. 4;

FIGS. 8A, 8B, 8C and 8D show aberrations of the lens arrangement shown in FIG. 7;

FIGS. 9A, 9B and 9C show lateral aberrations of the lens arrangement shown in FIG. 7;

FIGS. 11A, 11B, 11C and 11D show aberrations of the lens arrangement shown in FIG. 10;

FIGS. 12A, 12B and 12C show lateral aberrations of the lens arrangement shown in FIG. 10;

FIGS. 14A, 14B, 14C and 14D show aberrations of the lens arrangement shown in FIG. 13;

FIGS. 15A, 15B and 15C show lateral aberrations of the lens arrangement shown in FIG. 13;

FIGS. 17A, 17B, 17C and 17D show aberrations of the lens arrangement shown in FIG. 16;

FIGS. 18A, 18B and 18C show lateral aberrations of the lens arrangement shown in FIG. 16;

FIGS. 20A, 20B, 20C and 20D show aberrations of the lens arrangement shown in FIG. 19;

FIGS. 21A, 21B and 21C show lateral aberrations of the lens arrangement shown in FIG. 19;

FIGS. 23A, 23B, 23C and 23D show aberrations of the lens arrangement shown in FIG. 22;

FIGS. 24A, 24B and 24C show lateral aberrations of the lens arrangement shown in FIG. 22;

FIGS. 26A, 26B, 26C and 26D show aberrations of the lens arrangement shown in FIG. 25;

FIGS. 27A, 27B and 27C show lateral aberrations of the lens arrangement shown in FIG. 25;

FIGS. 29A, 29B, 29C and 29D show aberrations of the lens arrangement shown in FIG. 28;

FIGS. 30A, 30B and 30C show lateral aberrations of the lens arrangement shown in FIG. 28;

FIGS. 32A, 32B, 32C and 32D show aberrations of the lens arrangement shown in FIG. 31;

FIGS. 33A, 33B and 33C show lateral aberrations of the lens arrangement shown in FIG. 31;

FIG. 34 shows a lens arrangement of the sixth embodiment of a high zoom-ratio zoom lens system when an object at infinity is in an in-focus state at the short focal length extremity;

FIGS. 35A, 35B, 35C and 35D show aberrations of the lens arrangement shown in FIG. 34;

FIGS. 36A, 36B and 36C show lateral aberrations of the lens arrangement shown in FIG. 34.

DESCRIPTION OF THE PREFERRED EMBODIMENTS

Figure 37:
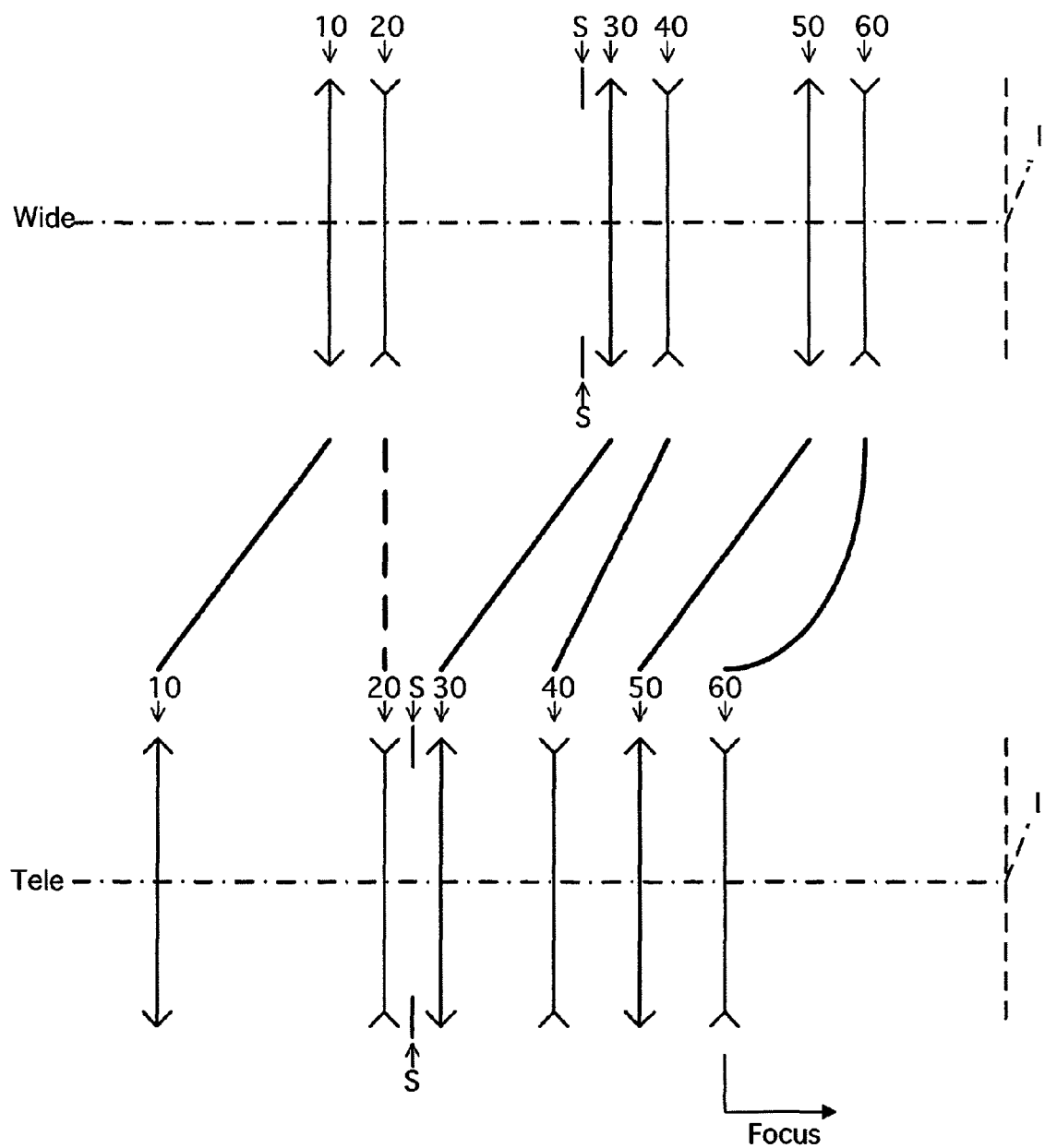
FIG. 37 shows lens-group moving paths of the high zoom-ratio zoom lens system according to the present invention.

The high zoom-ratio zoom lens system of the present invention, as shown in the lens-group moving paths of FIG. 37, includes a positive first lens group 10, a negative second lens group 20, a diaphragm S, a positive third lens group 30, a negative fourth lens group 40, a positive fifth lens group 50 and a negative sixth lens group 60, in this order from the object. 'I' designates the imaging plane.

Upon zooming from the short focal length extremity (Wide) to the long focal length extremity (Tele), the lens groups other than the negative second lens group 20, i.e., the positive first lens group 10, the positive third lens group 30, the negative fourth lens group 40, the positive fifth lens group 50 and the negative sixth lens group 60, respectively move along their individual moving paths toward the object, and the negative second lens group 20 remains stationary (does not move) with respect to the imaging plane I.

Accordingly, upon zooming from the short focal length extremity (Wide) to the long focal length extremity (Tele), the distance between the positive first lens group 10 and the negative second lens group 20 increases, and the distance between the negative second lens group 20 and the positive third lens group 30 decreases.

The diaphragm S which is provided between the negative second lens group 20 and the positive third lens group 30 integrally moves with the positive third lens group 30.

The negative sixth lens group 60 constitutes a focusing lens group and moves toward the image upon focusing on an object at infinity to an object at a closer distance.

The positive third lens group 30 and the positive fifth lens group 50 can be arranged to integrally move with each other. Due to this arrangement, focusing sensitivity can effectively be reduced, and the manufacture of the high zoom-ratio zoom lens system can be facilitated.

Condition (1) concerns a ratio ($f1/|f2|$) of the focal length f1 of the positive first lens group 10 to the focal length f2 of the negative second lens group 20.

If $f1/|f2|$ exceeds the upper limit of condition (1), the negative refractive power of the negative second lens group 20 becomes stronger, so that the correcting of astigmatism at the short focal length extremity becomes difficult.

If $f1/|f2|$ exceeds the lower limit of condition (1), the negative refractive power of the negative second lens group 20 becomes weaker, so that it becomes difficult to secure a longer back focal distance BF at the short focal length extremity.

If an attempt is made to make the distance between the negative second lens group 20 and the positive third lens group 30 longer for the purpose of securing a longer back focal distance at the short focal length extremity, the lens diameter of the positive first lens group 10 and that of the negative second lens group 20 become larger. Consequently, the correcting of astigmatism and field curvature becomes difficult. Moreover, the positive refractive power of the positive first lens group 10 becomes stronger, so that the correcting of spherical aberration and coma at the long focal length extremity becomes difficult.

Namely, by satisfying condition (1), the following effects can be obtained:

A) The correcting of astigmatism becomes easier, and a longer back focal distance at the short focal length extremity can easily be secured;

B) The correcting of spherical aberration and coma at the long focal length extremity becomes easier;

C) The difficulties in correcting astigmatism and field curvature due to the increase in diameters of the positive first lens group 10 and of the negative second lens group 20 is eliminated.

Condition (2) concerns the ratio (f1/f5) of the focal length f1 of the positive first lens group 10 to the focal length f5 of the positive fifth lens group 50.

If the positive refractive power of the positive fifth lens group 50 becomes stronger to extent that f1/f5 exceeds the upper limit of condition (2), the negative refractive power of the negative sixth lens group 60 has to be made stronger, corresponding to the above-increased positive refractive power of the positive fifth lens group 50 in order to adequately correct distortion at the short focal length extremity. This optical arrangement is necessary to balance the refractive power of the front lens group (the positive first lens group 10 and the negative second lens group 20) with that of the rear lens group (the positive fifth lens group 50 and the negative sixth lens group 60); however, the strong positive refractive power of the positive fifth lens group 50 cancels the strong negative refractive power of the negative sixth lens group 60, and vice versa. Consequently, fluctuations in spherical aberration and coma upon zooming increase.

If the positive refractive power of the positive fifth lens group 50 becomes weaker to extent that f1/f5 exceeds the lower limit of condition (2), it becomes disadvantageous to secure a longer back focal distance BF at the short focal length extremity. If an attempt is made to secure a longer back focal distance at the short focal length extremity, it is necessary to make the positive refractive power of the lens groups behind the negative second lens group 20 weaker, or, to make the negative reactive power of the lens groups behind the negative second lens group 20 stronger. However, as a result, the negative refractive power becomes dominant in the lens groups behind the negative second lens group 20, so that spherical aberration is overcorrected.

Namely, by satisfying condition (2), the following effects can be obtained:

A) The correcting of distortion can suitably be made at the short focal length extremity, and fluctuations in spherical aberration and coma upon zooming can be reduced; and B) A longer back focal distance at the short focal length extremity can easily be secured, and spherical aberration is prevented from being overcorrected (i.e., the amount of the correcting of spherical aberration can be maintained at a suitable level).

Condition (3) concerns an Abbe number v5p of at least three positive lens elements among more than three positive lens elements constituting the positive fifth lens group 50.

A glass lens-material which satisfies condition (3) generally has a low refractive index, so that such a glass lens-material is disadvantageous for the correcting of spherical aberration.

The present invention provides an optical arrangement in order to suitably perform the correcting of spherical aberration, i.e., the positive fifth lens group 50 includes more than three positive lens elements, and at least three positive lens elements are made from a glass lens-material satisfying condition (3). In other words, providing more than three positive lens elements can adequately distribute the positive refractive power over the positive fifth lens group 50. Consequently, the occurrence of spherical aberration can be reduced to a minimum.

If v5p exceeds the lower limit of condition (3), the correcting of axial chromatic aberration, particularly at the long focal length extremity becomes difficult.

The negative second lens group 20 contributes to zooming the most, and therefore is vulnerable to deterioration in optical quality due to manufacturing error. In order to reduce the above deterioration, the negative second lens group 20 is arranged to remain stationary between the short focal length extremity and the long focal length extremity when zooming is being performed.

The negative sixth lens group 60, which constitutes the focusing lens group, preferably includes three lens elements, i.e., a negative lens element, a negative lens element and a positive lens element, in this order from the object.

If the number of lens elements are increased, it is advantageous for the correcting of aberrations; however, a rapid focusing operation becomes difficult, since the weight of the focusing lens group (the negative sixth lens group 60) increases.

On the other hand, if the number of lens elements is only two or less, the correction of aberrations becomes insufficient.

In the high zoom-ratio zoom lens system of the present invention, the positive first lens group 10 and the positive fifth lens group 50 preferably include at least one positive lens element made from a glass lens-material of anomalous dispersion characteristics.

More specifically, it is desirable that the Abbe number of this glass lens-material be greater than 80 (i.e., to satisfy condition (4): vd>80), and that the partial dispersion ratio be greater than 0.535 (i.e., to satisfy condition (5): $P_{g,F}$>0.535).

It is more desirable that the partial dispersion ratio be greater than 0.540 (i.e., to satisfy condition (5'): $P_{g,F}$>0.540).

Accordingly, it becomes possible to adequately correct the secondary spectrum of the axial chromatic aberrations.

If a lens element made from a glass lens-material of higher anomalous dispersion characteristics is utilized in the positive first lens group 10, the secondary spectrum can be even more effectively corrected.

Specific numerical data of the embodiments will be described hereinafter. The zoom lens systems of each of the following embodiments are for use in a digital SLR camera.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, y designates the image height, the two types of dotted lines respectively indicate magnification with respect to the g and C lines; however, the d line as the base line coincides with the ordinate.

In the diagrams of astigmatism, y designates the image height, S designates the sagittal image, and M designates the meridional image.

In the diagrams of distortion, y designates the image height.

In the diagrams of lateral aberration, the solid line and the dotted line respectively indicate spherical aberrations with respect to the d and g lines.

In the tables, R designates the radius of curvature, d designates the lens-element thickness or a distance between lens elements (lens groups), Nd designates the refractive index of the d-line, and νd designates the Abbe number, and $P_{g,F}$ designates the partial dispersion ratio defined by $(N_g-N_F)/(N_F-N_c)$, FNO. designates the F-number, f designates the focal length of the entire lens system, W designates the half angle-of-view (°), y designates the image height, BF designates the back focal distance (the distance between the image-side surface of the most image-side cover glass to the imaging plane), L designates the length of the lens system (the distance from surface No. 1 to the imaging plane).

FNO., f, W, y, BF, L and d (which changes according to focusing) are shown in the following order: "the short focal length extremity, an intermediate focal length, the long focal length extremity".

Embodiment 1

FIG. 1 shows the lens arrangement of the first embodiment of a high zoom-ratio zoom lens system when an object at infinity is in an in-focus state at the long focal length extremity. FIGS. 2A through 2D show aberrations of the lens arrangement shown in FIG. 1. FIGS. 3A through 3C show lateral aberrations of the lens arrangement shown in FIG. 1.

Figure 4:
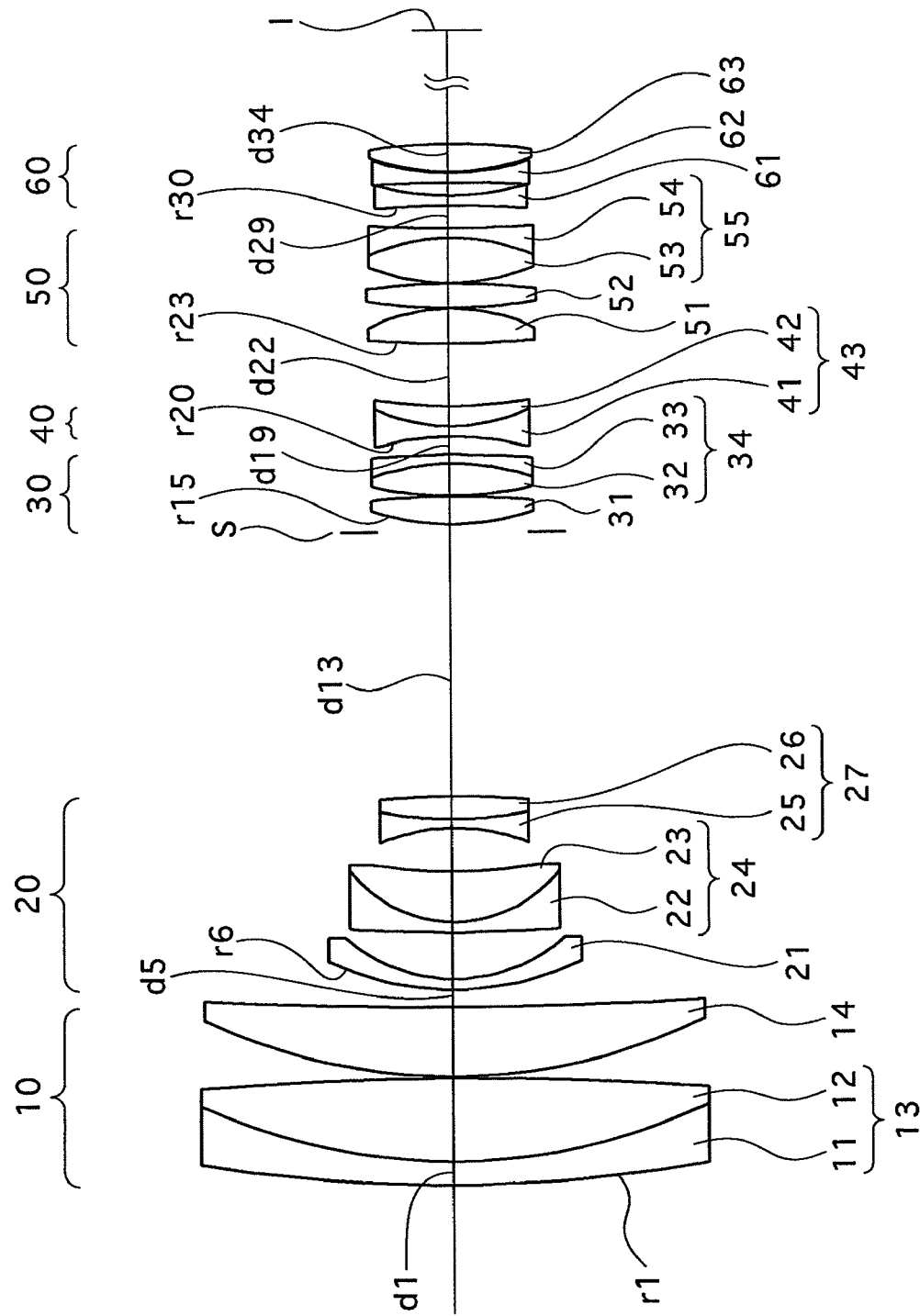
FIG. 4 shows a lens arrangement of the first embodiment of a high zoom-ratio zoom lens system when an object at infinity is in an in-focus state at the short focal length extremity.

FIG. 4 shows the lens arrangement of the first embodiment of a high zoom-ratio zoom lens system when an object at infinity is in an in-focus state at the short focal length extremity. FIGS. 5A through 5D show aberrations of the lens arrangement shown in FIG. 4. FIGS. 6A through 6C show lateral aberrations of the lens arrangement shown in FIG. 4.

Table 1 shows the surface data of the high zoom-ratio zoom lens system, Table 2 shows data of the high zoom-ratio zoom lens system, and Table 3 shows data of the lens groups of the high zoom-ratio zoom lens system.

The high zoom-ratio zoom lens system of the present invention includes a positive first lens group 10, a negative second lens group 20, a positive third lens group 30, a negative fourth lens group 40, a positive fifth lens group 50 and a negative sixth lens group 60, in this order from the object.

The positive first lens group 10 includes a cemented lens 13 including a negative meniscus lens element 11 having the convex surface facing toward the object and a biconvex positive lens element 12, and a positive meniscus lens element 14 having the convex surface facing toward the object, in this order from the object.

The negative second lens group 20 includes a negative meniscus lens element 21 having the convex surface facing toward the object, and a cemented lens 24 including a negative meniscus lens element 22 having the convex surface facing toward the object and a positive meniscus lens element 23 having the convex surface facing toward the object, and a cemented lens 27 including a biconcave negative lens element 25 and a biconvex positive lens element 26, in this order from the object.

The positive third lens group 30 includes a biconvex positive lens element 31 and a cemented lens 34 including a biconvex positive lens element 32 and a negative meniscus lens element 33 having the convex surface facing toward the image, in this order from the object.

The negative fourth lens group 40 includes a cemented lens 43 including a biconcave negative lens element 41 and a positive meniscus lens element 42 having the convex surface facing toward the object, in this order from the object.

The positive fifth lens group 50 includes a biconvex positive lens element 51, a biconvex positive lens element 52, and a cemented lens 55 including a biconvex positive lens element 53 and a biconcave negative lens element 54, in this order from the object.

The negative sixth lens group 60 includes a biconcave negative lens element 61, a biconcave negative lens element 62, and a biconvex positive lens element 63, in this order from the object.

It should be noted that an aspherical surface is not employed in any of the first through sixth lens groups.

In the first embodiment, the positive first lens group 10 is provided with a positive lens element made from a glass lens-material of anomalous dispersion characteristics, and the positive fifth lens group 50 is provided with a positive lens element made from a glass lens-material of anomalous dispersion characteristics.

TABLE 1

| No. | R | d | Nd | νd | $P_{g,F}$ |
|---|---|---|---|---|---|
| 1 | 191.245 | 2.800 | 1.83400 | 37.2 | |
| 2 | 73.266 | 10.188 | 1.43875 | 95.0 | 0.535 |
| 3 | −395.356 | 0.150 | | | |
| 4 | 70.272 | 8.500 | 1.58913 | 61.2 | |
| 5 | 602.678 | d5 | | | |
| 6 | 36.640 | 1.300 | 1.83400 | 37.2 | |
| 7 | 20.782 | 5.646 | | | |
| 8 | 213.262 | 1.300 | 1.80610 | 40.9 | |
| 9 | 16.561 | 6.137 | 1.78472 | 25.7 | |
| 10 | 65.171 | 5.258 | | | |
| 11 | −25.036 | 1.100 | 1.77250 | 49.6 | |
| 12 | 47.441 | 2.787 | 1.80518 | 25.4 | |
| 13 | −99.062 | d13 | | | |
| 14 (Diaphragm) | ∞ | 1.000 | | | |
| 15 | 31.169 | 3.348 | 1.62299 | 58.2 | |
| 16 | −100.241 | 0.100 | | | |
| 17 | 45.700 | 3.942 | 1.48749 | 70.2 | |
| 18 | −30.485 | 1.100 | 1.80518 | 25.4 | |
| 19 | −121.511 | d19 | | | |
| 20 | −33.827 | 1.200 | 1.74320 | 49.3 | |
| 21 | 21.750 | 2.522 | 1.80518 | 25.4 | |
| 22 | 56.053 | d22 | | | |
| 23 | 145.032 | 4.243 | 1.48749 | 70.2 | |
| 24 | −23.598 | 0.100 | | | |
| 25 | 66.781 | 2.977 | 1.61800 | 63.4 | |
| 26 | −87.412 | 0.100 | | | |
| 27 | 27.342 | 5.486 | 1.49700 | 81.6 | 0.537 |
| 28 | −25.521 | 1.200 | 1.80100 | 35.0 | |
| 29 | 138.304 | d29 | | | |
| 30 | −130.507 | 1.200 | 1.80500 | 34.6 | |
| 31 | 34.173 | 1.606 | | | |
| 32 | −148.058 | 1.200 | 1.77250 | 49.6 | |
| 33 | 31.301 | 0.100 | | | |
| 34 | 28.304 | 3.520 | 1.74077 | 27.8 | |
| 35 | −71.573 | — | | | |

TABLE 2

Data of Zoom Lens System
Zoom Ratio: 13.23

| | Short Focal Length | Intermediate Focal Length | Long Focal Length |
|---|---|---|---|
| FNO. | 3.5 | 4.9 | 5.8 |
| f | 25.70 | 100.00 | 340.00 |
| W | 30.3 | 8.0 | 2.4 |
| y | 14.24 | 14.24 | 14.24 |
| BF | 41.16 | 57.39 | 72.49 |
| L | 168.30 | 216.98 | 249.98 |
| d5 | 2.100 | 50.788 | 83.781 |
| d13 | 32.218 | 12.069 | 2.000 |
| d19 | 2.239 | 5.569 | 7.834 |

TABLE 2-continued

Data of Zoom Lens System
Zoom Ratio: 13.23

|     | Short Focal Length | Intermediate Focal Length | Long Focal Length |
|-----|-----|-----|-----|
| d22 | 7.676 | 4.345 | 2.081 |
| d29 | 2.795 | 6.716 | 1.680 |

TABLE 3

Lens Group Data

| Lens Group | First Surface | Focal Length |
|-----|-----|-----|
| 1 | 1 | 132.18 |
| 2 | 6 | −18.26 |
| 3 | 15 | 30.51 |
| 4 | 20 | −29.38 |
| 5 | 23 | 22.83 |
| 6 | 30 | −46.21 |

Embodiment 2

Figure 7:
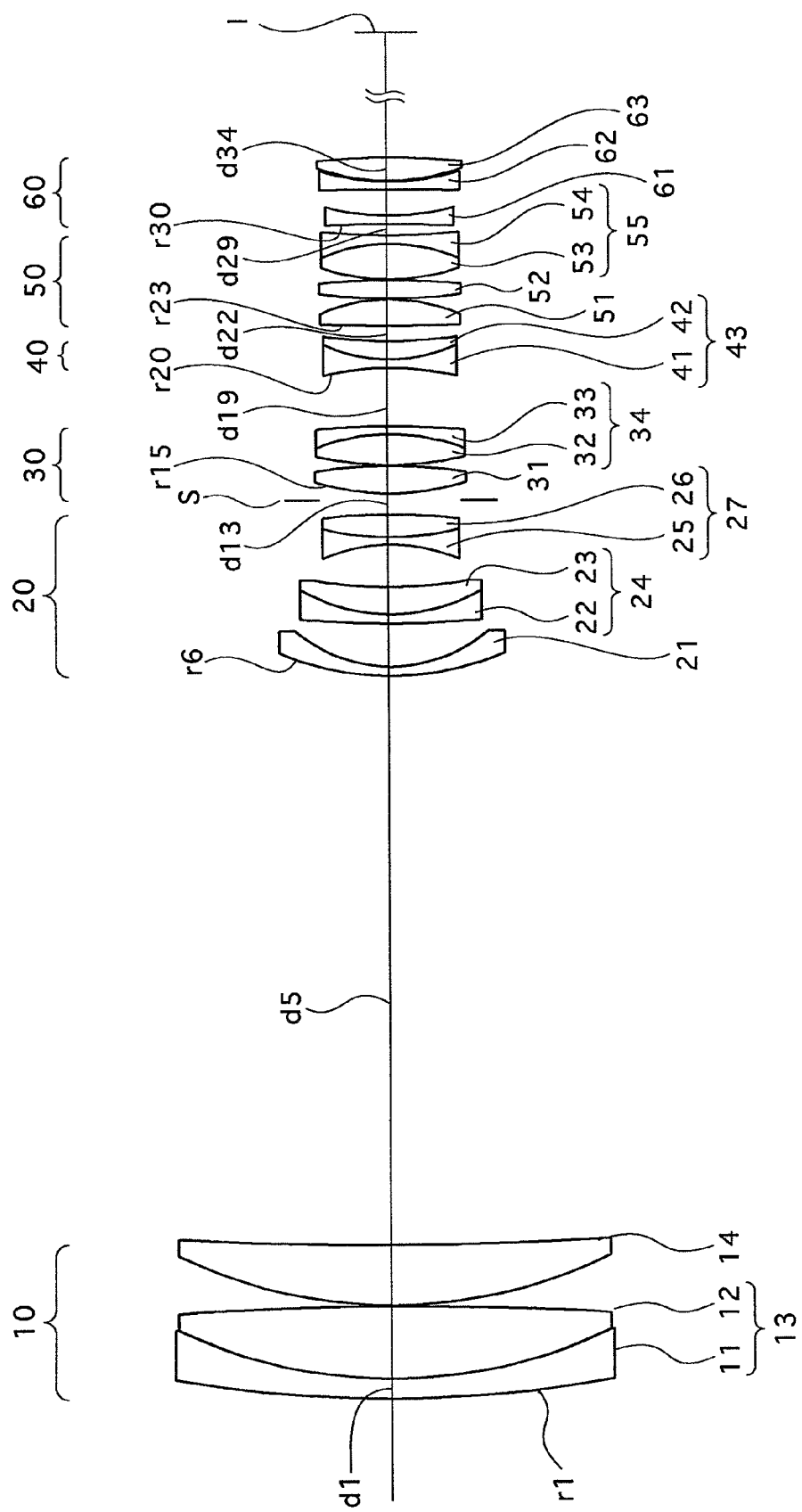
FIG. 7 shows a lens arrangement of a second embodiment of a high zoom-ratio zoom lens system when an object at infinity is in an in-focus state at the long focal length extremity.

FIG. 7 shows the lens arrangement of the second embodiment of a high zoom-ratio zoom lens system when an object at infinity is in an in-focus state at the long focal length extremity. FIGS. 8A through 8D show aberrations of the lens arrangement shown in FIG. 7. FIGS. 9A through 9C show lateral aberrations of the lens arrangement shown in FIG. 7.

Figure 10:
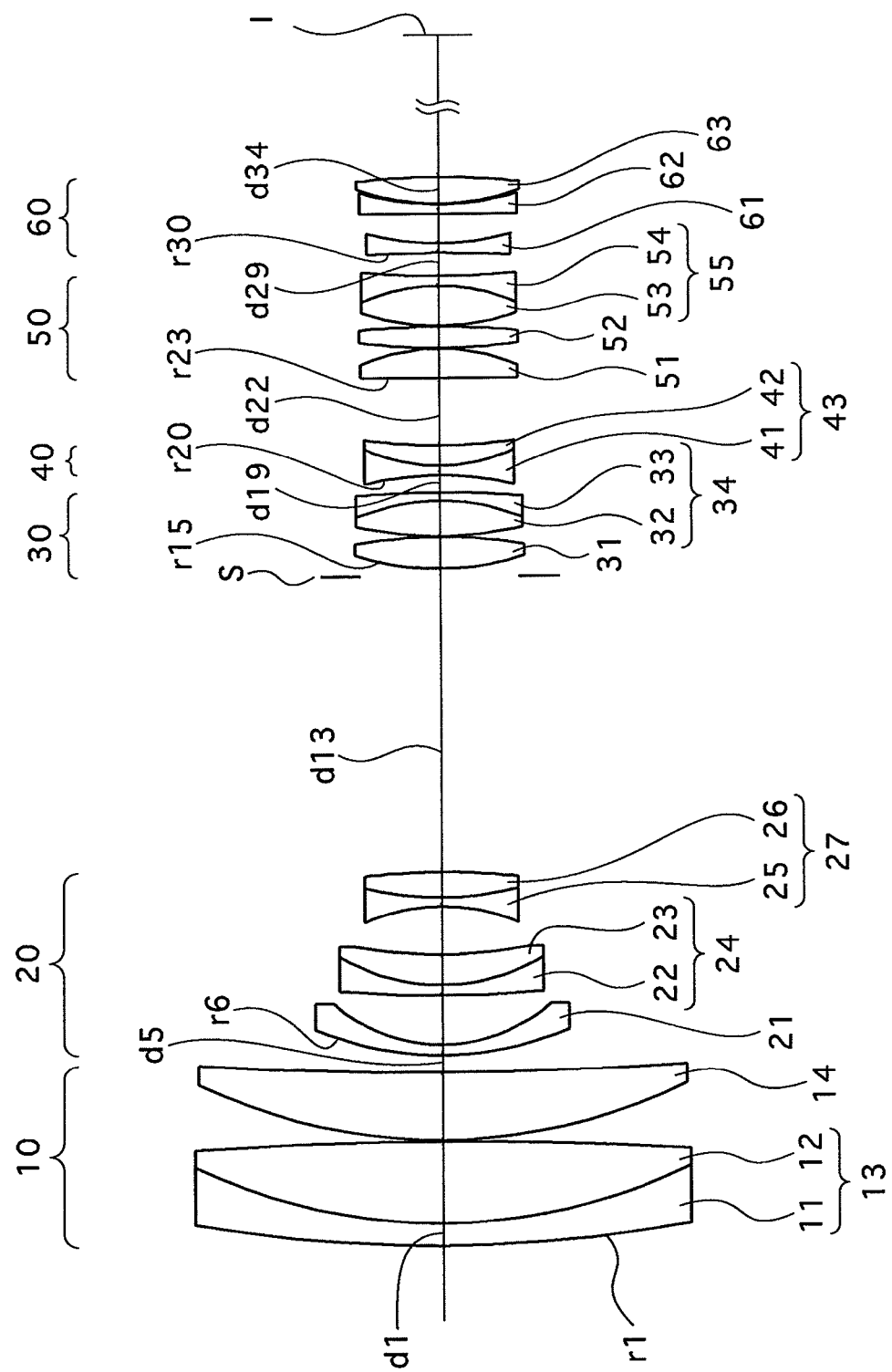
FIG. 10 shows a lens arrangement of the second embodiment of a high zoom-ratio zoom lens system when an object at infinity is in an in-focus state at the short focal length extremity.

FIG. 10 shows the lens arrangement of the second embodiment of a high zoom-ratio zoom lens system when an object at infinity is in an in-focus state at the short focal length extremity. FIGS. 11A through 11D show aberrations of the lens arrangement shown in FIG. 10. FIGS. 12A through 12C show lateral aberrations of the lens arrangement shown in FIG. 10.

Table 4 shows the surface data of the high zoom-ratio zoom lens system, Table 5 shows data of the high zoom-ratio zoom lens system, and Table 6 shows data of the lens groups of the high zoom-ratio zoom lens system.

In the second embodiment, the positive first lens group 10 is provided with a positive lens element made from a glass lens-material of anomalous dispersion characteristics, and the positive fifth lens group 50 is provided with a positive lens element made from a glass lens-material of anomalous dispersion characteristics.

The basic lens arrangement of the second embodiment is the same as that of the first embodiment; only the numerical data of Tables 4 through 6 differ from Tables 1 through 3 of the first embodiment.

TABLE 4

Surface Data

| No. | R | d | Nd | νd | $P_{g,F}$ |
|-----|-----|-----|-----|-----|-----|
| 1 | 174.827 | 2.800 | 1.83400 | 37.2 | |
| 2 | 71.176 | 10.147 | 1.43875 | 95.0 | 0.535 |
| 3 | −489.941 | 0.150 | | | |
| 4 | 69.379 | 8.500 | 1.60311 | 60.7 | |
| 5 | 554.596 | d5 | | | |
| 6 | 41.357 | 1.300 | 1.83499 | 40.7 | |
| 7 | 20.955 | 6.088 | | | |
| 8 | 151.746 | 1.300 | 1.80999 | 45.3 | |
| 9 | 25.428 | 3.826 | 1.78472 | 25.7 | |
| 10 | 63.835 | 5.945 | | | |

TABLE 4-continued

Surface Data

| No. | R | d | Nd | νd | $P_{g,F}$ |
|-----|-----|-----|-----|-----|-----|
| 11 | −24.253 | 1.100 | 1.77250 | 49.6 | |
| 12 | 40.038 | 3.181 | 1.80518 | 25.4 | |
| 13 | −84.137 | d13 | | | |
| 14 (Diaphragm) | ∞ | 1.000 | | | |
| 15 | 35.724 | 3.931 | 1.62299 | 58.2 | |
| 16 | −64.205 | 0.100 | | | |
| 17 | 47.229 | 4.361 | 1.48749 | 70.2 | |
| 18 | −28.415 | 1.100 | 1.80518 | 25.4 | |
| 19 | −116.590 | d19 | | | |
| 20 | −39.397 | 1.200 | 1.71300 | 53.9 | |
| 21 | 22.236 | 2.607 | 1.78472 | 25.7 | |
| 22 | 71.484 | d22 | | | |
| 23 | 548.548 | 3.691 | 1.48749 | 70.2 | |
| 24 | −24.766 | 0.100 | | | |
| 25 | 77.236 | 2.640 | 1.61800 | 63.4 | |
| 26 | −103.670 | 0.100 | | | |
| 27 | 30.289 | 5.060 | 1.49700 | 81.6 | 0.537 |
| 28 | −24.046 | 1.200 | 1.80100 | 35.0 | |
| 29 | 96.090 | d29 | | | |
| 30 | −159.931 | 1.200 | 1.80610 | 33.3 | |
| 31 | 34.628 | 3.647 | | | |
| 32 | −7992.498 | 1.200 | 1.77250 | 49.6 | |
| 33 | 34.567 | 0.100 | | | |
| 34 | 30.391 | 3.317 | 1.74077 | 27.8 | |
| 35 | −95.101 | — | | | |

TABLE 5

Data of Zoom Lens System
Zoom Ratio: 13.32

|     | Short Focal Length | Intermediate Focal Length | Long Focal Length |
|-----|-----|-----|-----|
| FNO. | 3.5 | 5.2 | 5.8 |
| f | 25.52 | 100.00 | 339.95 |
| W | 30.4 | 8.0 | 2.4 |
| y | 14.24 | 14.24 | 14.24 |
| BF | 39.00 | 57.05 | 75.08 |
| L | 172.15 | 215.27 | 249.99 |
| d5 | 2.100 | 45.222 | 79.946 |
| d13 | 36.781 | 12.580 | 2.000 |
| d19 | 2.127 | 5.678 | 8.294 |
| d22 | 8.346 | 4.795 | 2.180 |
| d29 | 2.910 | 9.052 | 1.600 |

TABLE 6

Lens Group Data

| Lens Group | First Surface | Focal Length |
|-----|-----|-----|
| 1 | 1 | 128.34 |
| 2 | 6 | −18.23 |
| 3 | 15 | 30.44 |
| 4 | 20 | −38.19 |
| 5 | 23 | 29.78 |
| 6 | 30 | −59.21 |

Embodiment 3

Figure 13:
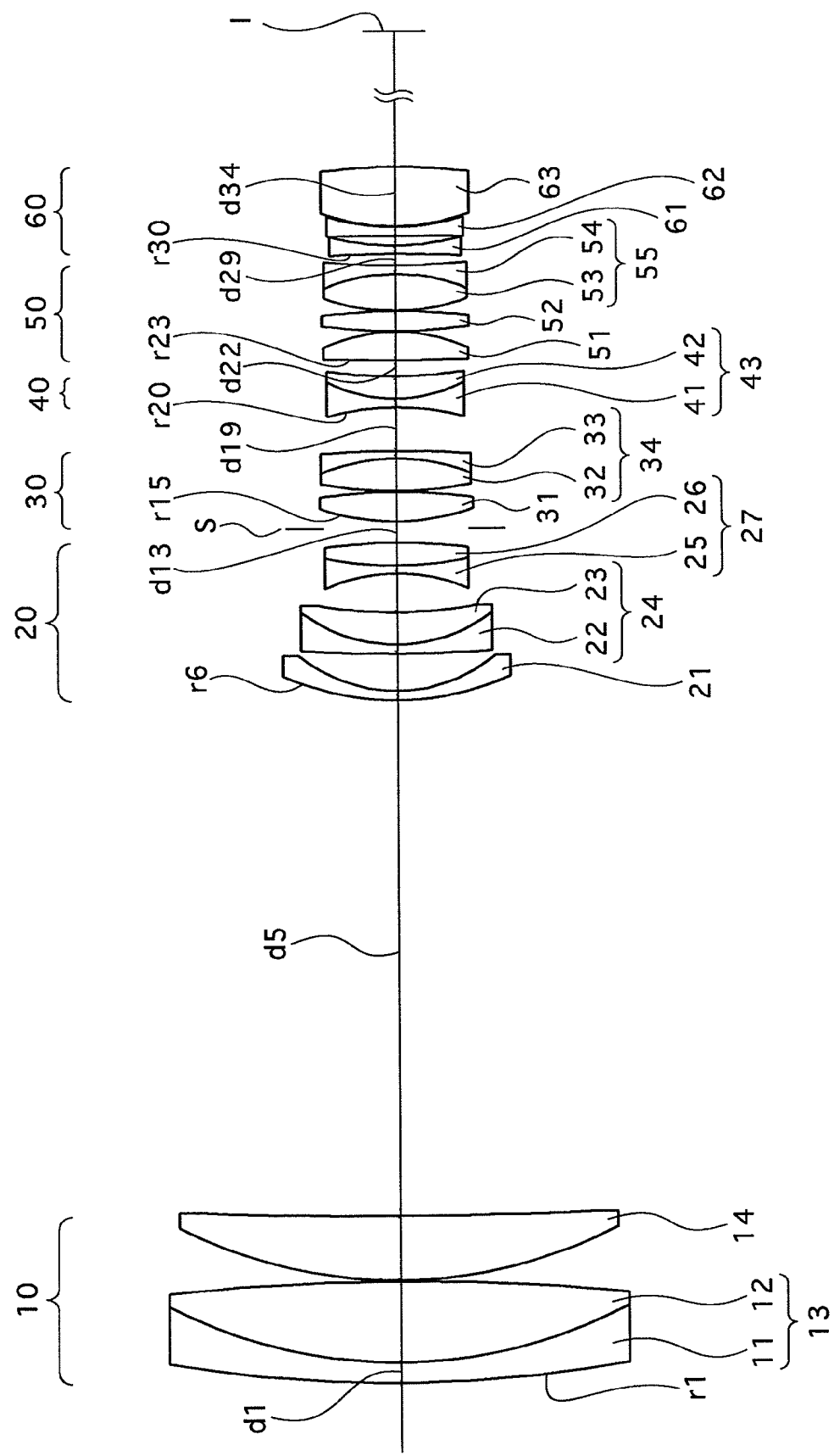
FIG. 13 shows a lens arrangement of a third embodiment of a high zoom-ratio zoom lens system when an object at infinity is in an in-focus state at the long focal length extremity.

FIG. 13 shows the lens arrangement of the third embodiment of a high zoom-ratio zoom lens system when an object at infinity is in an in-focus state at the long focal length extremity. FIGS. 14A through 14D show aberrations of the lens arrangement shown in FIG. 13. FIGS. 15A through 15C show lateral aberrations of the lens arrangement shown in FIG. 13.

Figure 16:
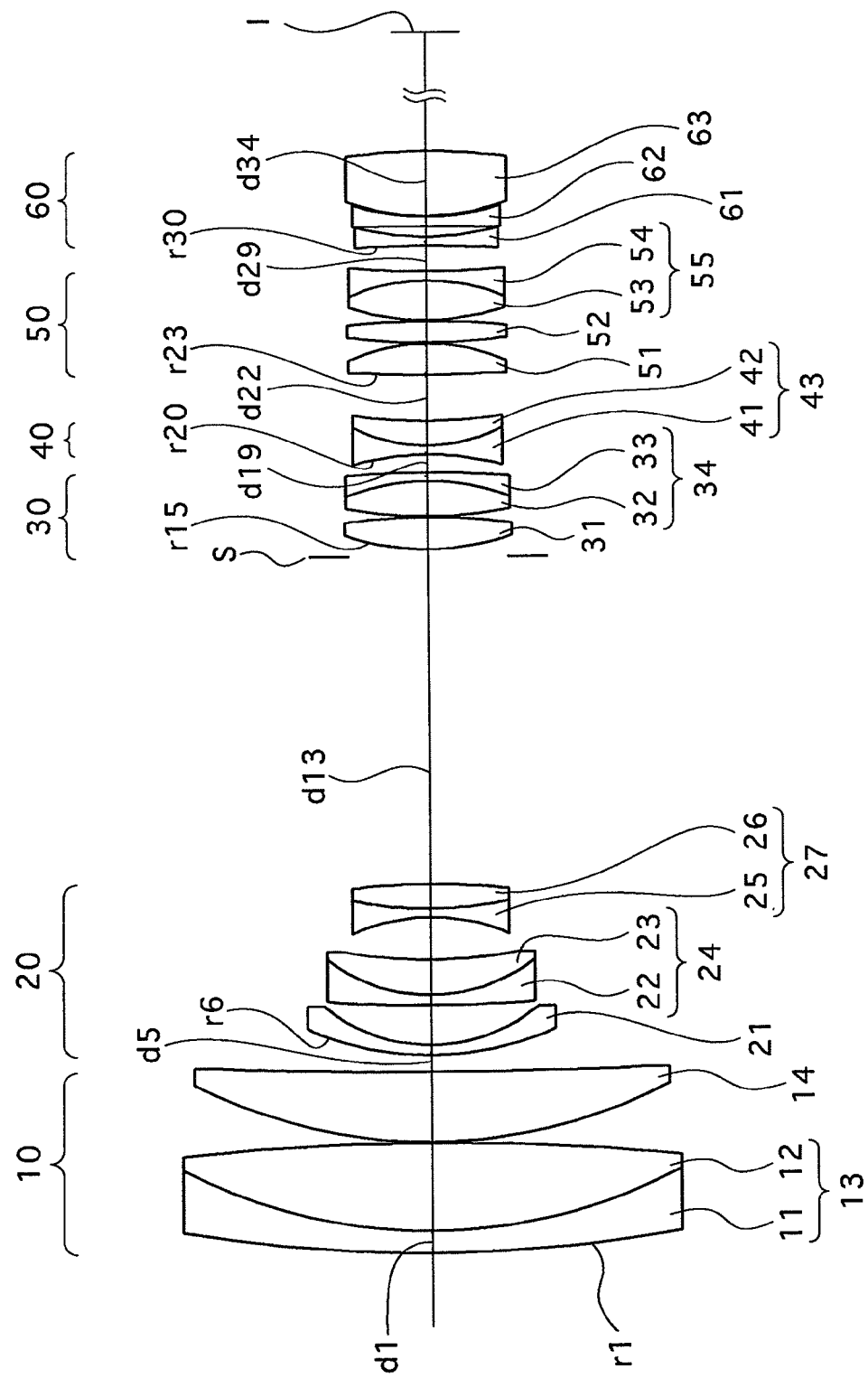
FIG. 16 shows a lens arrangement of the third embodiment of a high zoom-ratio zoom lens system when an object at infinity is in an in-focus state at the short focal length extremity.

FIG. 16 shows the lens arrangement of the third embodiment of a high zoom-ratio zoom lens system when an object at infinity is in an in-focus state at the short focal length extremity. FIGS. 17A through 17D show aberrations of the lens arrangement shown in FIG. 16. FIGS. 18A through 18C show lateral aberrations of the lens arrangement shown in FIG. 16.

Table 7 shows the surface data of the high zoom-ratio zoom lens system, Table 8 shows data of the high zoom-ratio zoom lens system, and Table 9 shows data of the lens groups of the high zoom-ratio zoom lens system.

In the third embodiment, the positive first lens group 10 is provided with a positive lens element made from a glass lens-material of anomalous dispersion characteristics, and the positive fifth lens group 50 is provided with a positive lens element made from a glass lens-material of anomalous dispersion characteristics.

The basic lens arrangement of the third embodiment is the same as that of the first embodiment; only the numerical data of Tables 7 through 9 differ from Tables 1 through 3 of the first embodiment.

TABLE 7

Surface Data

| No. | R | d | Nd | vd | $P_{g,F}$ |
|---|---|---|---|---|---|
| 1 | 189.013 | 2.800 | 1.83400 | 37.2 | |
| 2 | 69.063 | 11.200 | 1.43875 | 95.0 | 0.535 |
| 3 | −315.746 | 0.150 | | | |
| 4 | 66.883 | 8.923 | 1.60311 | 60.7 | |
| 5 | 820.261 | d5 | | | |
| 6 | 38.940 | 1.300 | 1.83500 | 41.2 | |
| 7 | 21.527 | 5.111 | | | |
| 8 | 190.368 | 1.300 | 1.80717 | 44.4 | |
| 9 | 21.947 | 4.500 | 1.78472 | 25.7 | |
| 10 | 61.726 | 5.401 | | | |
| 11 | −24.456 | 1.100 | 1.77250 | 49.6 | |
| 12 | 50.434 | 3.150 | 1.80518 | 25.4 | |
| 13 | −82.146 | d13 | | | |
| 14 (Diaphragm) | ∞ | 1.000 | | | |
| 15 | 32.588 | 4.091 | 1.62299 | 58.2 | |
| 16 | −77.064 | 0.100 | | | |
| 17 | 52.177 | 4.548 | 1.48749 | 70.2 | |
| 18 | −28.113 | 1.100 | 1.80518 | 25.4 | |
| 19 | −131.356 | d19 | | | |
| 20 | −36.235 | 1.200 | 1.71300 | 53.9 | |
| 21 | 20.709 | 3.116 | 1.78472 | 25.7 | |
| 22 | 61.774 | d22 | | | |
| 23 | 293.391 | 3.949 | 1.48749 | 70.2 | |
| 24 | −23.986 | 0.100 | | | |
| 25 | 74.402 | 2.770 | 1.61800 | 63.4 | |
| 26 | −95.932 | 0.100 | | | |
| 27 | 30.415 | 5.102 | 1.49700 | 81.6 | 0.537 |
| 28 | −25.537 | 1.200 | 1.80100 | 35.0 | |
| 29 | 103.525 | d29 | | | |
| 30 | −168.810 | 1.200 | 1.80610 | 33.3 | |
| 31 | 36.377 | 1.374 | | | |
| 32 | −339.625 | 1.200 | 1.77250 | 49.6 | |
| 33 | 32.830 | 0.100 | | | |
| 34 | 30.130 | 8.299 | 1.74077 | 27.8 | |
| 35 | −81.090 | — | | | |

TABLE 8

Various Data of Zoom Lens System
Zoom Ratio: 13.23

| | Short Focal Length | Intermediate Focal Length | Long Focal Length |
|---|---|---|---|
| FNO. | 3.5 | 5.4 | 5.8 |
| f | 25.70 | 100.00 | 339.88 |
| W | 30.3 | 7.9 | 2.4 |
| y | 14.24 | 14.24 | 14.24 |
| BF | 39.00 | 61.04 | 80.49 |
| L | 180.00 | 217.53 | 249.19 |
| d5 | 2.100 | 39.636 | 71.304 |
| d13 | 41.822 | 13.892 | 2.000 |
| d19 | 2.284 | 3.398 | 6.057 |
| d22 | 6.028 | 4.913 | 2.254 |
| d29 | 3.281 | 9.162 | 1.600 |

TABLE 9

Lens Group Data

| Lens Group | First Surface | Focal Length |
|---|---|---|
| 1 | 1 | 118.10 |
| 2 | 6 | −19.03 |
| 3 | 15 | 32.01 |
| 4 | 20 | −34.01 |
| 5 | 23 | 27.18 |
| 6 | 30 | −58.28 |

Embodiment 4

Figure 19:
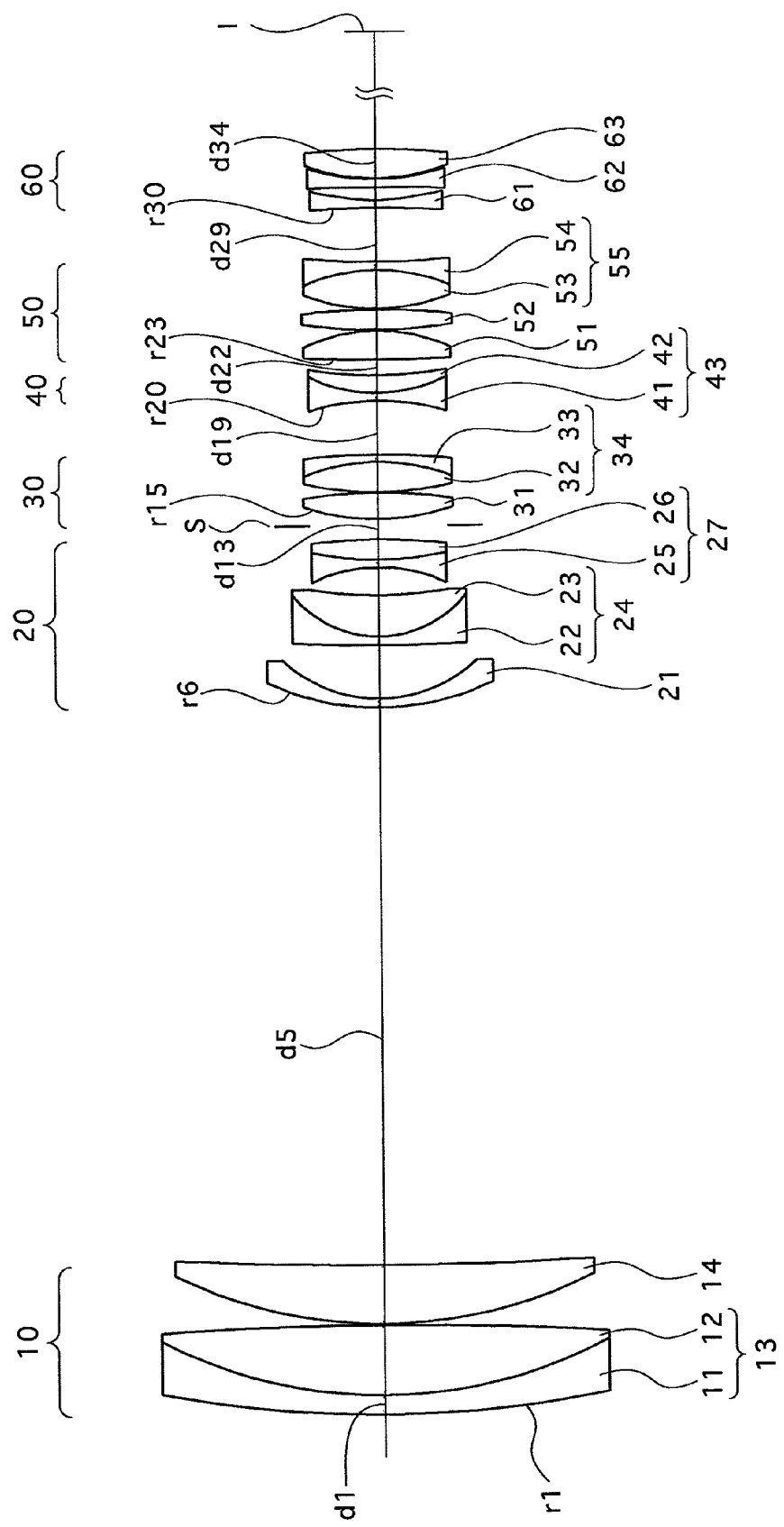
FIG. 19 shows a lens arrangement of a fourth embodiment of a high zoom-ratio zoom lens system when an object at infinity is in an in-focus state at the long focal length extremity.

FIG. 19 shows the lens arrangement of the fourth embodiment of a high zoom-ratio zoom lens system when an object at infinity is in an in-focus state at the long focal length extremity. FIGS. 20A through 20D show aberrations of the lens arrangement shown in FIG. 19. FIGS. 21A through 21C show lateral aberrations of the lens arrangement shown in FIG. 19.

Figure 22:
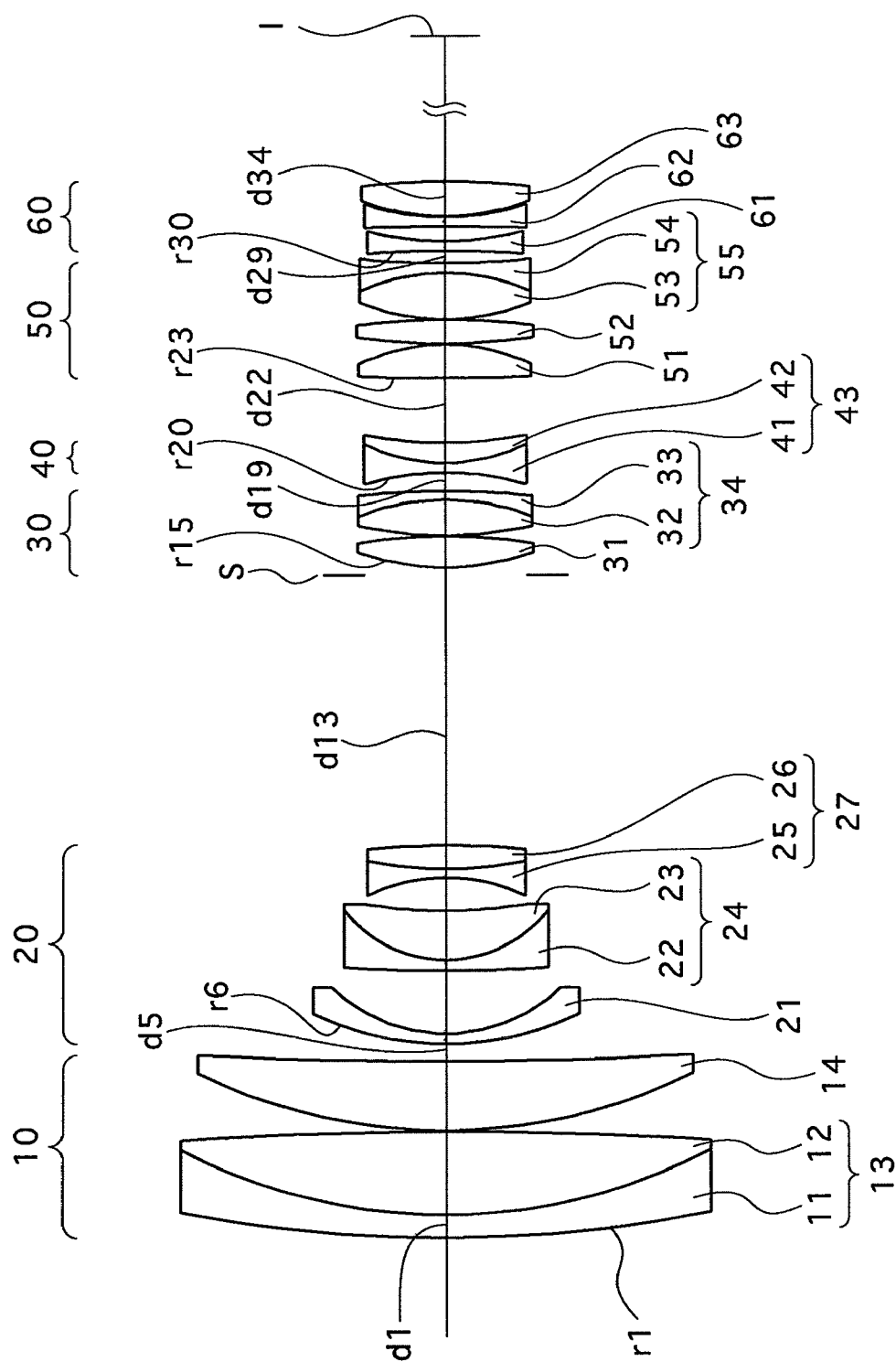
FIG. 22 shows a lens arrangement of the fourth embodiment of a high zoom-ratio zoom lens system when an object at infinity is in an in-focus state at the short focal length extremity.

FIG. 22 shows the lens arrangement of the fourth embodiment of a high zoom-ratio zoom lens system when an object at infinity is in an in-focus state at the short focal length extremity. FIGS. 23A through 23D show aberrations of the lens arrangement shown in FIG. 22. FIGS. 24A through 24C show lateral aberrations of the lens arrangement shown in FIG. 22.

Table 10 shows the surface data of the high zoom-ratio zoom lens system, Table 11 shows data of the high zoom-ratio zoom lens system, and Table 12 shows data of the lens groups of the high zoom-ratio zoom lens system.

In the fourth embodiment, the positive first lens group 10 is provided with a positive lens element made from a glass lens-material of anomalous dispersion characteristics, and the positive fifth lens group 50 is provided with a positive lens element made from a glass lens-material of anomalous dispersion characteristics.

The basic lens arrangement of the fourth embodiment is the same as that of the first embodiment; only the numerical data of Tables 10 through 12 differ from Tables 1 through 3 of the first embodiment.

TABLE 10

Surface Data

| No. | R | d | Nd | νd | P$_{g,F}$ |
|---|---|---|---|---|---|
| 1 | 171.091 | 2.800 | 1.83400 | 37.2 | |
| 2 | 71.027 | 10.168 | 1.43875 | 95.0 | 0.535 |
| 3 | −484.257 | 0.150 | | | |
| 4 | 69.258 | 8.500 | 1.58000 | 64.2 | |
| 5 | 597.496 | d5 | | | |
| 6 | 38.302 | 1.300 | 1.84922 | 42.5 | |
| 7 | 20.733 | 7.720 | | | |
| 8 | 201.247 | 1.300 | 1.80797 | 46.3 | |
| 9 | 16.200 | 6.010 | 1.78472 | 25.7 | |
| 10 | 62.149 | 4.057 | | | |
| 11 | −22.871 | 1.100 | 1.77482 | 45.1 | |
| 12 | 47.198 | 2.929 | 1.80518 | 25.4 | |
| 13 | −91.298 | d13 | | | |
| 14 (Diaphragm) | ∞ | 1.000 | | | |
| 15 | 34.399 | 3.823 | 1.62088 | 63.0 | |
| 16 | −70.934 | 0.100 | | | |
| 17 | 48.537 | 4.371 | 1.49309 | 69.6 | |
| 18 | −29.641 | 1.100 | 1.80518 | 25.4 | |
| 19 | −100.204 | d19 | | | |
| 20 | −35.014 | 1.200 | 1.71778 | 50.7 | |
| 21 | 22.992 | 2.523 | 1.80518 | 25.4 | |
| 22 | 55.474 | d22 | | | |
| 23 | 221.055 | 4.213 | 1.48749 | 70.2 | |
| 24 | −24.900 | 0.100 | | | |
| 25 | 70.726 | 2.994 | 1.61800 | 63.4 | |
| 26 | −95.494 | 0.100 | | | |
| 27 | 28.930 | 5.658 | 1.49700 | 81.6 | 0.537 |
| 28 | −26.709 | 1.200 | 1.79577 | 37.0 | |
| 29 | 108.263 | d29 | | | |
| 30 | −157.099 | 1.200 | 1.81287 | 33.7 | |
| 31 | 36.935 | 1.848 | | | |
| 32 | −308.629 | 1.200 | 1.77250 | 49.6 | |
| 33 | 32.760 | 0.100 | | | |
| 34 | 29.507 | 4.312 | 1.74077 | 27.8 | |
| 35 | −87.532 | — | | | |

TABLE 11

Various Data of Zoom Lens System
Zoom Ratio: 13.23

| | Short Focal Length | Intermediate Focal Length | Long Focal Length |
|---|---|---|---|
| FNO. | 3.5 | 4.9 | 5.8 |
| f | 25.70 | 100.00 | 340.03 |
| W | 30.3 | 8.0 | 2.4 |
| y | 14.24 | 14.24 | 14.24 |
| BF | 45.91 | 59.78 | 70.70 |
| L | 175.89 | 224.80 | 254.42 |
| d5 | 2.100 | 51.019 | 80.638 |
| d13 | 33.170 | 12.890 | 2.000 |
| d19 | 2.247 | 4.934 | 7.818 |
| d22 | 7.885 | 5.199 | 2.315 |
| d29 | 1.500 | 7.902 | 7.876 |

TABLE 12

Lens Group Data

| Lens Group | First Surface | Focal Length |
|---|---|---|
| 1 | 1 | 130.18 |
| 2 | 6 | −16.48 |
| 3 | 15 | 29.52 |
| 4 | 20 | −31.54 |
| 5 | 23 | 25.64 |
| 6 | 30 | −54.37 |

Embodiment 5

Figure 25:
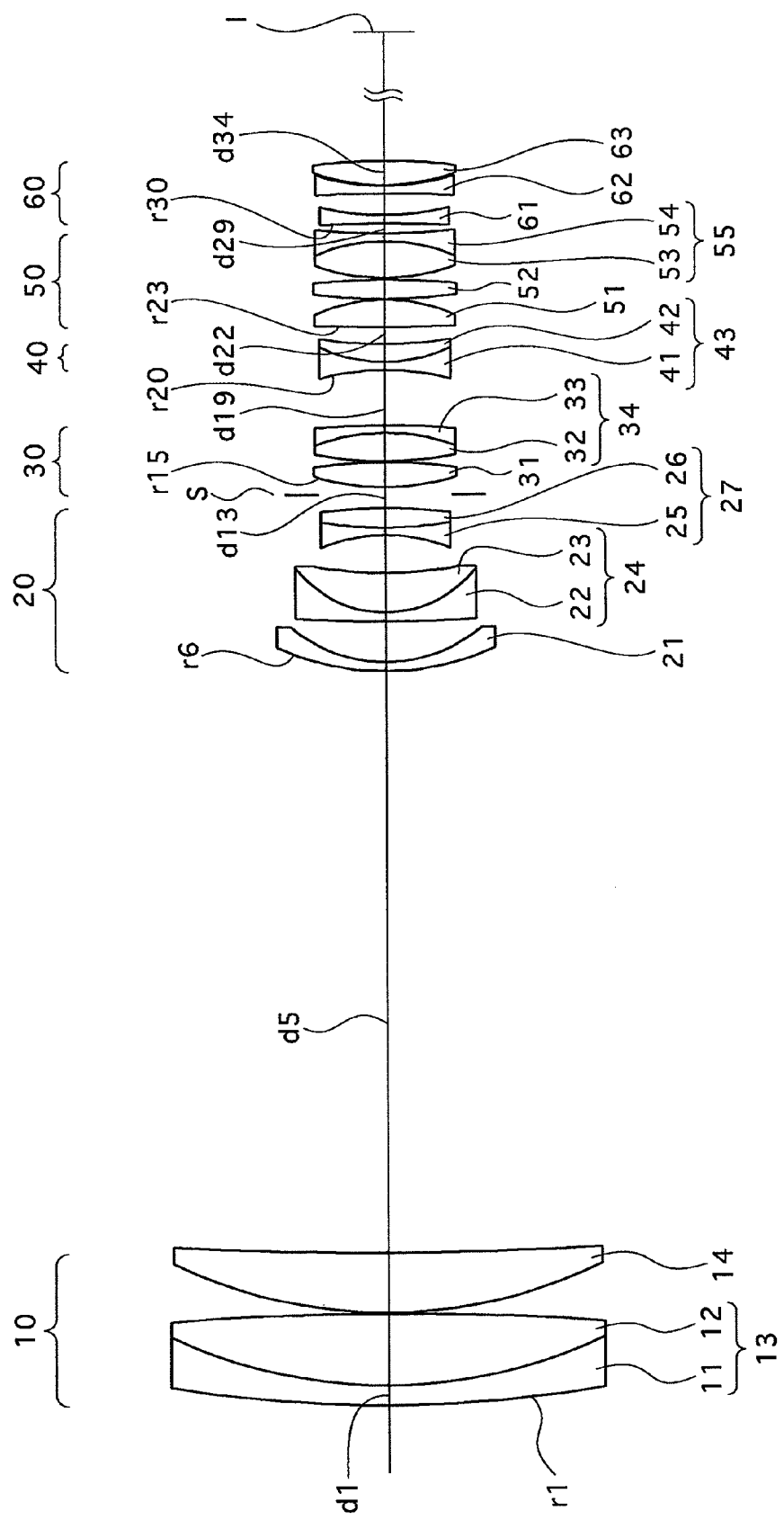
FIG. 25 shows a lens arrangement of a fifth embodiment of a high zoom-ratio zoom lens system when an object at infinity is in an in-focus state at the long focal length extremity.

FIG. 25 shows the lens arrangement of the fifth embodiment of a high zoom-ratio zoom lens system when an object at infinity is in an in-focus state at the long focal length extremity. FIGS. 26A through 26D show aberrations of the lens arrangement shown in FIG. 25. FIGS. 27A through 27C show lateral aberrations of the lens arrangement shown in FIG. 25.

Figure 28:
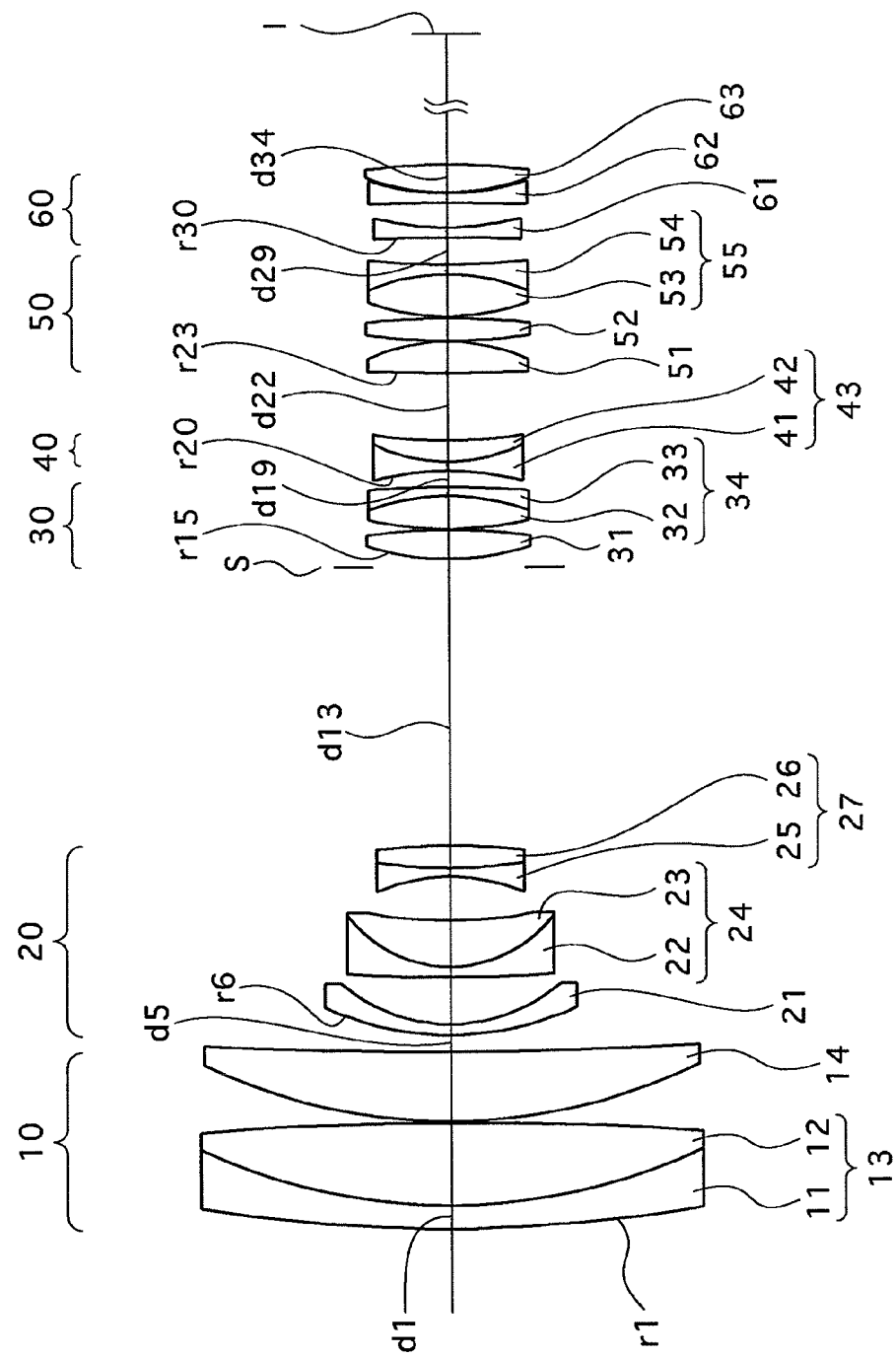
FIG. 28 shows a lens arrangement of the fifth embodiment of a high zoom-ratio zoom lens system when an object at infinity is in an in-focus state at the short focal length extremity.
Figure 31:
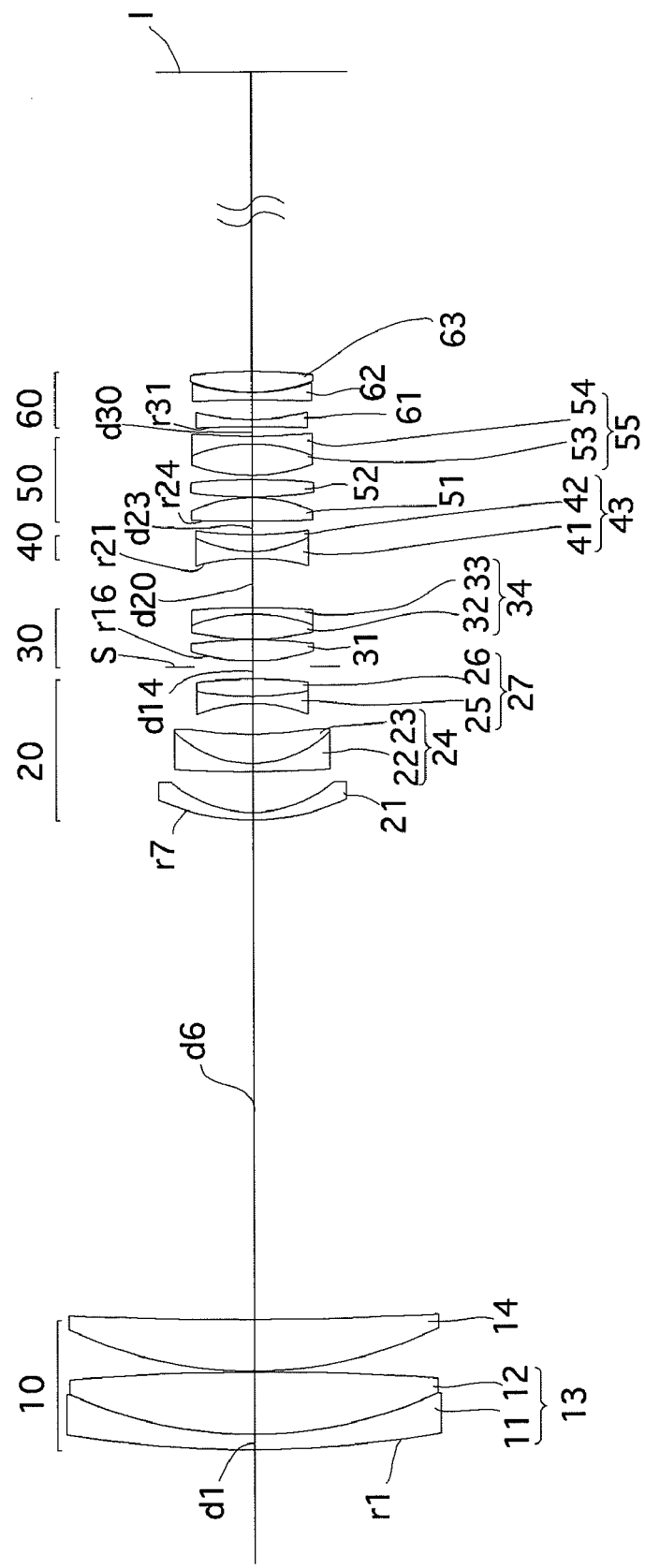
FIG. 31 shows a lens arrangement of a sixth embodiment of a high zoom-ratio zoom lens system when an object at infinity is in an in-focus state at the long focal length extremity.

FIG. 28 shows the lens arrangement of the fifth embodiment of a high zoom-ratio zoom lens system when an object at infinity is in an in-focus state at the short focal length extremity. FIGS. 29A through 29D show aberrations of the lens arrangement shown in FIG. 28. FIGS. 30A through 30C show lateral aberrations of the lens arrangement shown in FIG. 28.

Table 13 shows the surface data of the zoom-ratio zoom lens system, Table 14 shows data of the zoom-ratio zoom lens system, and Table 15 shows data of the lens groups of the zoom-ratio zoom lens system.

In the fifth embodiment, the positive first lens group 10 is provided with a positive lens element made from a glass lens-material of anomalous dispersion characteristics, and the positive fifth lens group 50 is provided with a positive lens element made from a glass lens-material of anomalous dispersion characteristics.

The basic lens arrangement of the fifth embodiment is the same as that of the first embodiment; only the numerical data of Tables 13 through 15 differ from Tables 1 through 3 of the first embodiment.

TABLE 13

Surface Data

| No. | R | d | Nd | νd | P$_{g,F}$ |
|---|---|---|---|---|---|
| 1 | 189.695 | 2.800 | 1.83400 | 37.2 | |
| 2 | 72.783 | 10.172 | 1.43875 | 95.0 | 0.535 |
| 3 | −417.015 | 0.150 | | | |
| 4 | 70.342 | 8.500 | 1.60311 | 60.7 | |
| 5 | 581.514 | d5 | | | |
| 6 | 37.734 | 1.300 | 1.83400 | 37.2 | |
| 7 | 21.038 | 5.760 | | | |
| 8 | 180.879 | 1.300 | 1.80610 | 40.9 | |
| 9 | 16.218 | 5.666 | 1.78472 | 25.7 | |
| 10 | 59.117 | 5.345 | | | |
| 11 | −24.171 | 1.100 | 1.77250 | 49.6 | |
| 12 | 59.022 | 2.758 | 1.80518 | 25.4 | |
| 13 | −81.361 | d13 | | | |
| 14 (Diaphragm) | ∞ | 1.000 | | | |
| 15 | 33.430 | 3.595 | 1.62299 | 58.2 | |
| 16 | −69.681 | 0.100 | | | |
| 17 | 48.820 | 4.076 | 1.48749 | 70.2 | |
| 18 | −28.680 | 1.100 | 1.80518 | 25.4 | |
| 19 | −117.135 | d19 | | | |
| 20 | −35.610 | 1.200 | 1.71300 | 53.9 | |
| 21 | 22.013 | 2.531 | 1.78472 | 25.7 | |
| 22 | 61.547 | d22 | | | |
| 23 | 292.354 | 3.881 | 1.48749 | 70.2 | |
| 24 | −24.161 | 0.128 | | | |
| 25 | 71.587 | 2.777 | 1.61800 | 63.4 | |
| 26 | −97.019 | 0.241 | | | |
| 27 | 29.206 | 5.216 | 1.49700 | 81.6 | 0.537 |
| 28 | −25.222 | 1.200 | 1.80100 | 35.0 | |
| 29 | 102.342 | d29 | | | |
| 30 | −162.180 | 1.200 | 1.80610 | 33.3 | |
| 31 | 37.125 | 3.022 | | | |
| 32 | −304.686 | 1.200 | 1.77250 | 49.6 | |
| 33 | 32.428 | 0.100 | | | |
| 34 | 29.709 | 3.457 | 1.74077 | 27.8 | |
| 35 | −82.392 | — | | | |

TABLE 14

Various Data of Zoom Lens System
Zoom Ratio: 13.32

|  | Short Focal Length | Intermediate Focal Length | Long Focal Length |
|---|---|---|---|
| FNO. | 3.5 | 5.1 | 5.8 |
| f | 25.56 | 100.08 | 340.48 |
| W | 30.4 | 8.0 | 2.4 |
| y | 14.24 | 14.24 | 14.24 |
| BF | 38.91 | 55.51 | 73.16 |
| L | 169.87 | 215.37 | 250.29 |
| d5 | 2.100 | 47.600 | 82.540 |
| d13 | 34.279 | 11.900 | 2.000 |
| d19 | 1.979 | 5.518 | 7.868 |
| d22 | 8.341 | 4.802 | 2.453 |
| d29 | 3.378 | 9.165 | 1.387 |

TABLE 15

Lens Group Data

| Lens Group | First Surface | Focal Length |
|---|---|---|
| 1 | 1 | 130.86 |
| 2 | 6 | −18.26 |
| 3 | 15 | 30.26 |
| 4 | 20 | −33.39 |
| 5 | 23 | 26.67 |
| 6 | 30 | −56.63 |

Embodiment 6

The basic lens arrangement of the sixth embodiment is the same as that of the first embodiment; only the numerical data of Tables 16 through 18 differ from Tables 1 through 3 of the first embodiment.

The sixth embodiment of the present invention illustrates an example in which the positive first lens group 10 and the positive fifth lens group 50 each includes a positive lens element made from a glass lens-material of anomalous dispersion characteristics.

In the sixth embodiment, the positive first lens group 10 is provided with a positive lens element made from a glass lens-material of anomalous dispersion characteristics, and the positive fifth lens group 50 is provided with a positive lens element made from a glass lens-material of anomalous dispersion characteristics.

The basic lens arrangement of the sixth embodiment is the same as that of the first embodiment; only the numerical data of Tables 16 through 18 differ from Tables 1 through 3 of the first embodiment.

TABLE 16

Surface Data

| No. | R | d | Nd | νd | $P_{g,F}$ |
|---|---|---|---|---|---|
| 1 | 189.894 | 2.500 | 1.83400 | 37.3 |  |
| 2 | 72.940 | 0.000 |  |  |  |
| 3 | 72.940 | 10.200 | 1.43775 | 94.8 | 0.543 |
| 4 | −406.625 | 0.150 |  |  |  |
| 5 | 70.308 | 8.500 | 1.60311 | 60.7 |  |
| 6 | 573.023 | d6 |  |  |  |
| 7 | 37.658 | 1.300 | 1.83400 | 37.3 |  |
| 8 | 20.990 | 6.680 |  |  |  |
| 9 | 202.948 | 1.300 | 1.80610 | 40.7 |  |
| 10 | 18.409 | 4.860 | 1.78472 | 25.7 |  |
| 11 | 62.423 | 5.060 |  |  |  |
| 12 | −24.503 | 1.100 | 1.77250 | 49.6 |  |
| 13 | 45.211 | 2.910 | 1.80518 | 25.5 |  |
| 14 | −88.641 | d14 |  |  |  |
| 15 (Diaphragm) | ∞ | 1.000 |  |  |  |
| 16 | 34.144 | 3.490 | 1.62041 | 60.3 |  |
| 17 | −74.900 | 0.100 |  |  |  |
| 18 | 47.719 | 4.090 | 1.48749 | 70.4 |  |
| 19 | −28.748 | 1.100 | 1.80518 | 25.5 |  |
| 20 | −107.421 | d20 |  |  |  |
| 21 | −35.280 | 1.200 | 1.71300 | 53.9 |  |
| 22 | 20.846 | 2.700 | 1.78472 | 25.7 |  |
| 23 | 61.066 | d23 |  |  |  |
| 24 | 269.415 | 3.920 | 1.48749 | 70.4 |  |
| 25 | −24.422 | 0.120 |  |  |  |
| 26 | 71.902 | 2.840 | 1.61800 | 63.4 |  |
| 27 | −91.600 | 0.750 |  |  |  |
| 28 | 29.644 | 5.220 | 1.49700 | 81.6 | 0.537 |
| 29 | −25.090 | 1.200 | 1.80610 | 33.3 |  |
| 30 | 110.292 | d30 |  |  |  |
| 31 | −165.614 | 1.200 | 1.80610 | 33.3 |  |
| 32 | 38.079 | 3.190 |  |  |  |
| 33 | −322.381 | 1.200 | 1.77250 | 49.6 |  |
| 34 | 32.457 | 0.100 |  |  |  |
| 35 | 29.793 | 3.390 | 1.74077 | 27.8 |  |
| 36 | −89.105 | — |  |  |  |

TABLE 17

Data of Zoom Lens System
Zoom Ratio: 13.28

|  | Short Focal Length | Intermediate Focal Length | Long Focal Length |
|---|---|---|---|
| FNO. | 3.5 | 5.0 | 5.8 |
| f | 25.68 | 99.89 | 340.96 |
| W | 30.3 | 8.0 | 2.4 |
| y | 14.24 | 14.24 | 14.24 |
| BF | 39.01 | 55.48 | 73.25 |
| L | 169.82 | 216.55 | 250.58 |
| d6 | 2.000 | 48.676 | 82.082 |
| d14 | 34.121 | 12.526 | 2.000 |
| d20 | 2.185 | 5.629 | 8.103 |
| d23 | 8.092 | 4.648 | 2.174 |
| d30 | 3.042 | 8.222 | 1.600 |

TABLE 18

Lens Group Data

| Lens Group | First Surface | Focal Length |
|---|---|---|
| 1 | 1 | 130.68 |
| 2 | 7 | −18.24 |
| 3 | 16 | 30.54 |
| 4 | 21 | −33.25 |
| 5 | 24 | 26.53 |
| 6 | 31 | −56.46 |

The numerical values of conditions (1) through (3) for each embodiment are shown in Table 19.

TABLE 19

|  | Embod. 1 | Embod. 2 | Embod. 3 | Embod. 4 | Embod. 5 | Embod. 6 |
|---|---|---|---|---|---|---|
| Cond. (1) | 7.24 | 7.04 | 6.21 | 7.90 | 7.16 | 7.16 |
| Cond. (2) | 5.79 | 4.31 | 4.34 | 5.08 | 4.91 | 4.93 |
| Cond. (3) | 63.4 | 63.4 | 63.4 | 63.4 | 63.4 | 63.4 |

As can be understood from Table 19, the first through fifth embodiments satisfy conditions (1) through (3). Furthermore, as can be understood from the aberration diagrams and lateral aberration diagrams, the various aberrations are suitably corrected.

According to the present invention, a high zoom-ratio zoom lens system including six lens groups, i.e., a positive lens group, a negative lens group, a positive lens group and a negative lens group in this order from the object, with the following features can be attained:

superior optical quality;

a zoom ratio exceeding 13:1;

a focal length of 350 mm at the long focal length extremity;

an f-number of 5.8; and an angle-of-view of approximately 60° at the short focal length extremity.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A high zoom-ratio zoom lens system comprising a positive first lens group, a negative second lens group, a positive third lens group, a negative fourth lens group, a positive fifth lens group, and a negative sixth lens group, in this order from an object, wherein upon zooming from the short focal length extremity to the long focal length extremity, a distance between said positive first lens group and said negative second lens group increases, and a distance between said negative second lens group and said positive third lens group decreases;

wherein said high zoom-ratio zoom lens system satisfies the following conditions:

$5.0 < f1/|f2| < 9.0 \ (f2 < 0)$ $4.1 < f1/f5 < 6.0$ wherein f1 designate the focal length of said positive first lens group;

f2 designate the focal length of said negative second lens group; and f5 designate the focal length of said positive fifth lens group.

2. The high zoom-ratio zoom lens system according to claim 1, wherein said positive fifth lens group comprises more than three positive lens elements, and at least three positive lens elements satisfy the following condition:

$\nu 5p > 60$ wherein

ν5p designates the Abbe number of each of said at least three positive lens elements of said positive fifth lens group.

3. The high zoom-ratio zoom lens system according to claim 1, wherein when zooming is being performed, said negative second lens group remains stationary with respect to the imaging plane of said high zoom-ratio zoom lens system.

4. The high zoom-ratio zoom lens system according to claim 1, wherein said negative sixth lens group comprises a negative lens element, a negative lens element and a positive lens element, in this order from the object.

5. The high zoom-ratio zoom lens system according to claim 1, wherein each of said positive first lens group and said positive fifth lens group comprises at least one positive lens element that is made from a glass lens-material of anomalous dispersion characteristics; and, said at least one positive lens element satisfies the following conditions:

$\nu d > 80$ $P_{g,F} > 0.535$ wherein

νd designates the Abbe number of said at least one positive lens element; and $P_{g,F}$ designates the partial dispersion ratio of said at least one positive lens element.

6. The high zoom-ratio zoom lens system according to claim 5, further satisfying the following condition:

$P_{g,F} > 0.540$ wherein $P_{g,F}$ designates the partial dispersion ratio of said at least one positive lens element.

* * * * *